United States Patent
Huang et al.

(10) Patent No.: US 10,721,109 B2
(45) Date of Patent: *Jul. 21, 2020

(54) TRANSMISSION APPARATUS AND TRANSMISSION METHOD OF AN AGGREGATE PHYSICAL LAYER PROTOCOL DATA UNIT

(71) Applicant: Panasonic Intellectual Property Management Co., Ltd., Osaka (JP)

(72) Inventors: Lei Huang, Singapore (SG); Hong Cheng Michael Sim, Singapore (SG); Takenori Sakamoto, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,951

(22) Filed: Apr. 4, 2019

(65) Prior Publication Data
US 2019/0229968 A1    Jul. 25, 2019

Related U.S. Application Data

(63) Continuation of application No. 15/797,965, filed on Oct. 30, 2017, now Pat. No. 10,298,430, which is a
(Continued)

(30) Foreign Application Priority Data

Jun. 3, 2015    (JP) .................................. 2015-113063

(51) Int. Cl.
*H04L 27/26*    (2006.01)
*H04L 1/00*    (2006.01)
(Continued)

(52) U.S. Cl.
CPC .......... *H04L 27/2626* (2013.01); *H04L 1/005* (2013.01); *H04L 1/0041* (2013.01);
(Continued)

(58) Field of Classification Search
CPC ............. H04L 27/2613; H04L 27/2602; H04L 27/2607; H04L 1/0041; H04L 1/0045; H04L 1/0057; H04L 27/2626; H04L 1/06
(Continued)

(56) References Cited

U.S. PATENT DOCUMENTS 10,298,430 B2 * 5/2019 Huang ................. H04L 5/0094
2010/0107042 A1 4/2010 Sawai et al.
(Continued)

FOREIGN PATENT DOCUMENTS

EP           3258625 A1    12/2017
WO     2015/102181 A1     7/2015

OTHER PUBLICATIONS

Extended European Search Report, dated May 16, 2018, for the related European Patent Application No. 16802743.1.
(Continued)

*Primary Examiner* — Emmanuel Bayard
(74) *Attorney, Agent, or Firm* — Seed IP Law Group LLP

(57) ABSTRACT

A transmission apparatus includes a transmission signal generator which, in operation, generates a transmission signal having an aggregate physical layer protocol data unit (PPDU) that includes a legacy preamble, a legacy header, a non-legacy preamble, a plurality of non-legacy headers and a plurality of data fields; and a transmitter which, in operation, transmits the generated transmission signal, wherein the legacy preamble, the legacy header and the plurality of non-legacy headers are transmitted using a standard bandwidth, the non-legacy preamble and the plurality of data fields are transmitted using a variable bandwidth that is
(Continued)

larger than the standard bandwidth and wherein a plurality of sets of each of the plurality of non-legacy headers and each of the plurality of data fields are transmitted sequentially in a time domain.

12 Claims, 18 Drawing Sheets

Related U.S. Application Data continuation of application No. PCT/JP2016/002226, filed on Apr. 28, 2016.

(51) Int. Cl.
*H04L 1/06* (2006.01)
*H04L 5/00* (2006.01)
*H04L 29/06* (2006.01)
*H04L 29/08* (2006.01)

(52) U.S. Cl.
CPC .......... *H04L 1/0045* (2013.01); *H04L 1/0057* (2013.01); *H04L 1/0088* (2013.01); *H04L 1/0091* (2013.01); *H04L 1/06* (2013.01); *H04L 1/0631* (2013.01); *H04L 5/0094* (2013.01); *H04L 27/2602* (2013.01); *H04L 27/2607* (2013.01); *H04L 27/2613* (2013.01); *H04L 69/22* (2013.01); *H04L 69/323* (2013.01)

(58) Field of Classification Search
USPC ........................................ 375/260, 295, 316
See application file for complete search history.

(56) References Cited

U.S. PATENT DOCUMENTS

| | | |
|---|---|---|
| 2013/0107912 A1 | 5/2013 | Ponnampalam |
| 2013/0230120 A1 | 9/2013 | Yang et al. |
| 2013/0260685 A1 | 10/2013 | Agrawal et al. |
| 2013/0286961 A1 | 10/2013 | Vermani et al. |
| 2015/0146653 A1 | 5/2015 | Zhang et al. |
| 2015/0326408 A1 | 11/2015 | Vermani et al. |
| 2015/0365257 A1* | 12/2015 | Suh ........................ H04L 27/261 375/295 |
| 2016/0119047 A1 | 4/2016 | Lee |
| 2016/0198311 A1 | 7/2016 | Kwon et al. |
| 2016/0227532 A1 | 8/2016 | Azizi et al. |
| 2016/0323424 A1* | 11/2016 | Merlin .................... H04L 69/22 |
| 2016/0337153 A1 | 11/2016 | Seok |
| 2017/0201305 A1 | 7/2017 | Moon et al. |
| 2017/0201357 A1 | 7/2017 | Choi et al. |
| 2018/0279170 A1 | 9/2018 | Sakamoto et al. |

OTHER PUBLICATIONS

IEEE Std 802.11ad(TM)—2012, "Part 11: Wireless LAN Medium Access Control (MAC) and Physical Layer (PHY) Specifications, Amendment 3. Enhancements for Very High Throughput in the 60 GHz Band", Dec. 28, 2012.

International Search Report of PCT application No. PCT/JP2016/002226 dated Jul. 26, 2016.

* cited by examiner

FIG. 2

| FIELD NAME | WIDTH IN BITS | DESCRIPTION |
|---|---|---|
| SCRAMBLER INITIALIZATION | 7 | BITS X1 THROUGH X7 OF INITIAL SCRAMBLER STATE |
| MCS | 5 | |
| LENGTH | 18 | NUMBER OF DATA OCTETS IN PSDU. RANGE 1 THROUGH 262143 |
| ADDITIONAL PPDU | 1 | VALUE OF 1 INDICATES THAT A SEPARATE PPDU WITHOUT AN IFS OR PREAMBLE IS FOLLOWING IMMEDIATELY AFTER THIS PPDU, AS A FOLLOWING PPDU. VALUE OF 0 INDICATES THERE IS NO ADDITIONAL PPDU FOLLOWING THIS PPDU. NOTE THAT THE ADDITIONAL PPDU FIELD OF ALL PPDUS IN AN AGGREGATE PPDU IS SET TO 1, EXCEPT FOR THE LAST PPDU IN THE AGGREGATE PPDU, WHERE THIS FIELD IS SET TO 0. |
| PACKET TYPE | 1 | PACKET TYPE = 0 INDICATES A PPDU WHERE A DATA PORTION FOLLOWS ONE OR MORE TRN-R SUBFIELDS (WHEN BEAM TRACKING REQUEST FIELD IS 0), OR A PPDU INCLUDING A REQUEST TO APPEND A TRN-R SUBFIELD TO A RESPONSE PPDU HEREAFTER (WHEN BEAM TRACKING REQUEST FIELD IS 1). PACKET TYPE = 1 INDICATES A PPDU WHERE A DATA PORTION IS FOLLOWED BY ONE OR MORE TRN-T SUBFIELDS. THIS FIELD IS RESERVED IN A CASE WHERE THE TRAINING LENGTH FIELD IS 0. |
| TRAINING LENGTH | 5 | IN A CASE WHERE THE BEAM TRACKING REQUEST FIELD IS 0, THIS TRAINING LENGTH FIELD INDICATES THE LENGTH OF THE TRAINING FIELD. A VALUE OF 0 INDICATES THAT NO TRAINING FIELD EXISTS IN THIS PPDU. IN A CASE WHERE THE BEAM TRACKING REQUEST FIELD IS 1 AND THE PACKET TYPE FIELD IS 1, THIS TRAINING LENGTH FIELD INDICATES THE LENGTH OF THE TRAINING FIELD APPENDED TO THIS PPDU. IN A CASE WHERE THE PACKET TYPE FIELD IS 0, THE TRAINING LENGTH FIELD INDICATES THE LENGTH OF A TRAINING FIELD REQUESTED WITH REGARD TO RECEPTION TRAINING. IN A CASE WHERE THE ADDITIONAL PPDU FIELD IS 1, THIS TRAINING LENGTH FILED IS TO BE SET TO 0. |
| AGGREGATE | 1 | |
| BEAM TRACKING REQUEST | 1 | 1 SET TO INDICATE NECESSITY FOR BEAM TRACKING REQUEST, OTHERWISE SET TO 0. WHEN THE TRAINING LENGTH FIELD IS 0, THIS BEAM TRACKING REQUEST IS RESERVED. |
| LAST RSSI | 4 | |
| TURNAROUND | 1 | |
| RESERVE BIT | 4 | |
| HCS | 16 | HEADER CHECK SEQUENCE |

FIG. 6

| FIELD NAME | WIDTH IN BITS | DESCRIPTION |
|---|---|---|
| SCRAMBLER INITIALIZATION | 7 | BITS X1 THROUGH X7 OF INITIAL SCRAMBLER STATE |
| MCS | 5 | |
| LENGTH | 18 | NUMBER OF DATA OCTETS IN PSDU. RANGE 1 THROUGH 262143 |
| ADDITIONAL PPDU | 1 | VALUE OF 1 INDICATES THAT A SEPARATE MF PPDU WITHOUT AN IFS OR PREAMBLE IS FOLLOWING IMMEDIATELY AFTER THIS MF PPDU, AS A FOLLOWING MF PPDU. VALUE OF 0 INDICATES THERE IS NO ADDITIONAL MF PPDU FOLLOWING THIS MF PPDU. NOTE THAT THE ADDITIONAL PPDU FIELD OF ALL MF PPDUS IN AN AGGREGATE MF PPDU IS SET TO 1, EXCEPT FOR THE LAST MF PPDU IN THE AGGREGATE MF PPDU, WHERE THIS FIELD IS SET TO 0. |
| PACKET TYPE | 1 | PACKET TYPE = 0 INDICATES AN MF PPDU WHERE A DATA PORTION FOLLOWS ONE OR MORE TRN-R SUBFIELDS (WHEN BEAM TRACKING REQUEST FIELD IS 0), OR AN MF PPDU INCLUDING A REQUEST TO APPEND A TRN-R SUBFIELD TO A RESPONSE PPDU HEREAFTER (WHEN BEAM TRACKING REQUEST FIELD IS 1). PACKET TYPE = 1 INDICATES A PPDU WHERE A DATA PORTION IS FOLLOWED BY ONE OR MORE TRN-T SUBFIELDS. THIS FIELD IS RESERVED IN A CASE WHERE THE TRAINING LENGTH FIELD IS 0. |
| TRAINING LENGTH | 5 | IN A CASE WHERE THE BEAM TRACKING REQUEST FIELD IS 0, THIS TRAINING LENGTH FIELD INDICATES THE LENGTH OF THE TRAINING FIELD. A VALUE OF 0 INDICATES THAT NO TRAINING FIELD EXISTS IN THIS MF PPDU. IN A CASE WHERE THE BEAM TRACKING REQUEST FIELD IS 1 AND THE PACKET TYPE FIELD IS 1, THIS TRAINING LENGTH FIELD INDICATES THE LENGTH OF THE TRAINING FIELD APPENDED TO THIS PPDU. IN A CASE WHERE THE PACKET TYPE FIELD IS 0, THE TRAINING LENGTH FIELD INDICATES THE LENGTH OF A TRAINING FIELD REQUESTED WITH REGARD TO RECEPTION TRAINING. IN A CASE WHERE THE ADDITIONAL PPDU FIELD IS 1, THIS TRAINING LENGTH FILED IS TO BE SET TO 0. |
| AGGREGATE | 1 | |
| BEAM TRACKING REQUEST | 1 | 1 SET TO INDICATE NECESSITY FOR BEAM TRACKING, OTHERWISE SET TO 0. WHEN THE TRAINING LENGTH FIELD IS 0, THIS BEAM TRACKING REQUEST IS RESERVED. |
| BW | 3 | CHANNEL BANDWIDTH |
| STBC | 1 | SET TO 1 TO INDICATE STBC BEING USED, OTHERWISE SET TO 0. |
| $N_{sts}$ | 3 | NUMBER OF SPACE-TIME STREAMS |
| LAST RSSI | 4 | |
| TURNAROUND | 1 | |
| RESERVE BIT | 4 | |
| HCS | 16 | HEADER CHECK SEQUENCE |

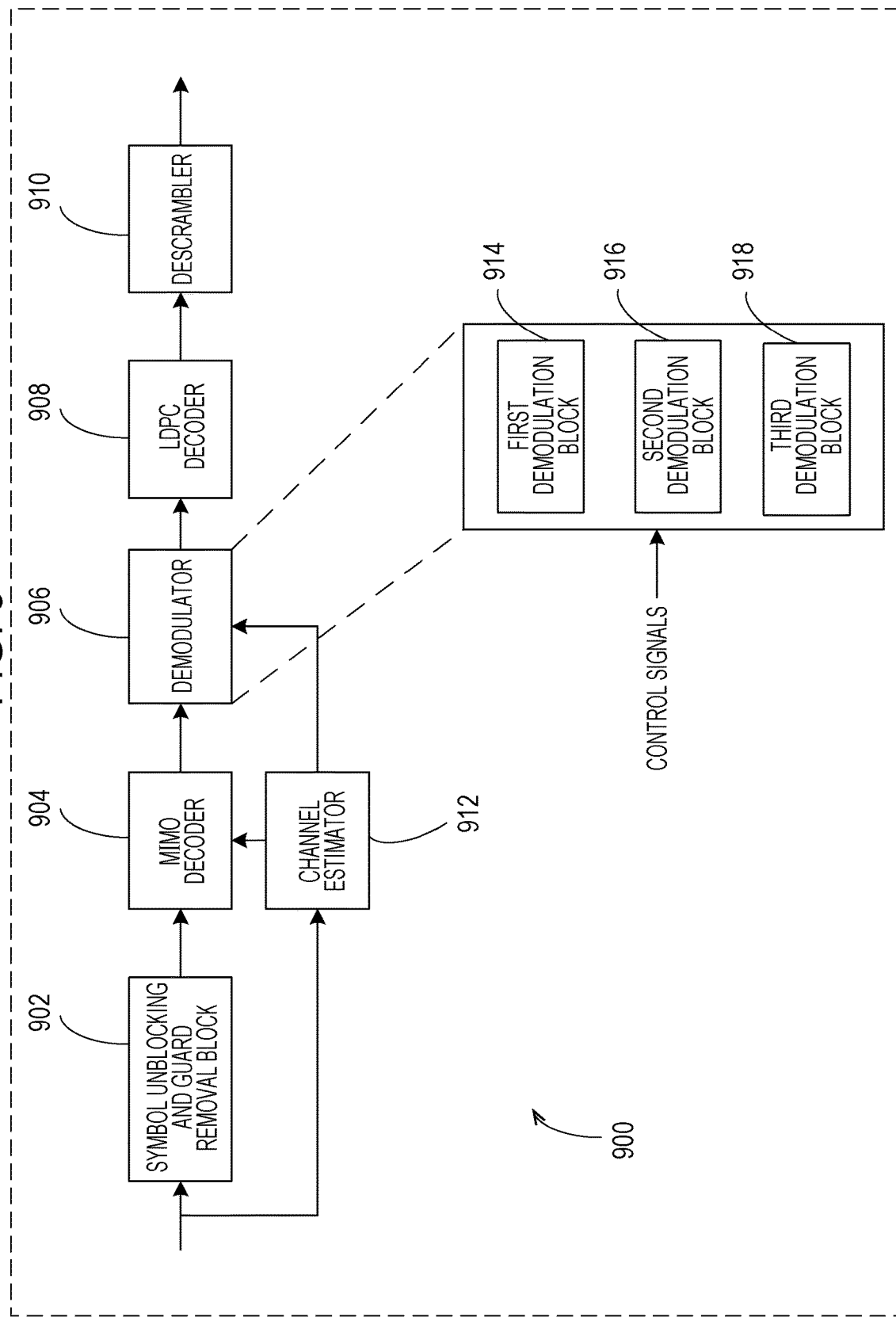

TRANSMISSION APPARATUS AND TRANSMISSION METHOD OF AN AGGREGATE PHYSICAL LAYER PROTOCOL DATA UNIT

BACKGROUND

1. Technical Field

The present disclosure generally pertains to wireless communications and, more particularly, to a method for formatting and transmitting an aggregate physical layer protocol data unit (PPDU) in a wireless communications system.

2. Description of the Related Art

Interest in unlicensed 60 GHz millimeter wave (mmW) networks is increasing. wireless Hi-Definition (HD) technology is the first 60 GHz mmW industry standard, which enables multi-gigabit wireless streaming of high-definition audio, video and data among consumer electronics, personal computer and portable products. Another multi-gigabit wireless communications technology operating over the 60 GHz mmW frequency band is WiGig technology, which has been standardized by the Institute of Electrical and Electronic Engineers (IEEE) as the IEEE 802.11ad standard (see IEEE 802.11ad-2012).

The WiGig technology supplements and extends the IEEE 802.11 media access control (MAC) layer and is backward compatible with the IEEE 802.11 wireless local area network (WLAN) standard. The WiGig MAC supports a centralized network architecture such as an infrastructure basic service set (BSS) or a personal BSS (PBSS), where only the central coordinator, e.g., an access point (AP) or personal BSS control point (PCP), transmits beacons to synchronize all stations (STAs) in the network. Rather than other IEEE 802.11 WLAN technologies operating over 2.4 GHz or 5 GHz frequency band, the WiGig technology makes extensive use of BF (beamforming) to achieve directional transmissions.

Due to a standard bandwidth of 2.16 GHz, the WiGig technology is able to offer a physical layer (PHY) data rate of up to 6.7 Gbps. The WiGig PHY supports both single carrier (SC) modulation and orthogonal frequency division multiplexing (OFDM) modulation. For the purpose of increasing transmission efficiency, the WiGig PHY also supports "aggregate PPDU". In the context of SC modulation, the aggregate PPDU is a sequence of two or more SC PPDUs transmitted without inter-frame spacing (IFS), preamble and separation between PPDU transmissions.

A prevailing application of the WiGig technology is a cable replacement for wired digital interface. For example, the WiGig technology can be used to implement a wireless Universal Serial Bus (USB) link for instant synchronization between smart phones or tablets or a wireless High-Definition Multimedia Interface (HDMI) link for video streaming. The state-of-the-art wired digital interfaces (e.g., USB 3.5 and HDMI 1.3) enable data rates up to tens of Gbps and therefore the WiGig technology also needs to be evolved to match them. Techniques for supporting multiple input multiple output (MIMO) transmission with variable bandwidth while maintaining backward compatibility with existing (i.e., legacy) WiGig devices would be desirable for Next Generation 60 GHz (NG60) WiGig to achieve PHY data rates up to tens of Gbps.

In order to keep backward compatibility with legacy WiGig devices, the NG60 WiGig shall be able to support both legacy format (LF) PPDUs, defined in IEEE 802.11ad, with a standard bandwidth, and mixed format (MF) PPDUs with capability of accommodating MIMO transmission with variable bandwidth. A non-limiting embodiment contributes to providing a transmission format and a transmission method of aggregate MF PPDU in an efficient way such that transmission efficiency can be maximized.

SUMMARY

In one general aspect, the techniques disclosed here feature: a transmission apparatus including a transmission signal generator which, in operation, generates a transmission signal having an aggregate physical layer protocol data unit (aggregate PPDU) that includes a legacy preamble, a legacy header, a non-legacy preamble, a plurality of non-legacy headers and a plurality of data fields; and a transmitter which, in operation, transmits the generated transmission signal, wherein the legacy preamble, the legacy header and the plurality of non-legacy headers are transmitted using a standard bandwidth, the non-legacy preamble and the plurality of data fields are transmitted using a variable bandwidth that is the same as or greater than the standard bandwidth, and a plurality of sets of each of the plurality of non-legacy headers and each of the plurality of data fields are transmitted sequentially in a time domain.

With the transmission apparatus and transmission method of aggregate MF PPDU of the present disclosure, transmission efficiency is maximized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a diagram illustrating the fields of an example header according to the related art;

FIG. 6 is a diagram illustrating the content of an example NG60 header according to the present disclosure;

FIG. 9 is a block diagram illustrating an example Rx baseband processor for receiving the MF SC PPDU according to the present disclosure;

DETAILED DESCRIPTION

Various embodiments of the present disclosure will now be described in detail with reference to the annexed drawings. In the following description, a detailed description of known functions and configurations incorporate herein has been omitted for clarity and conciseness.

Figure 1:
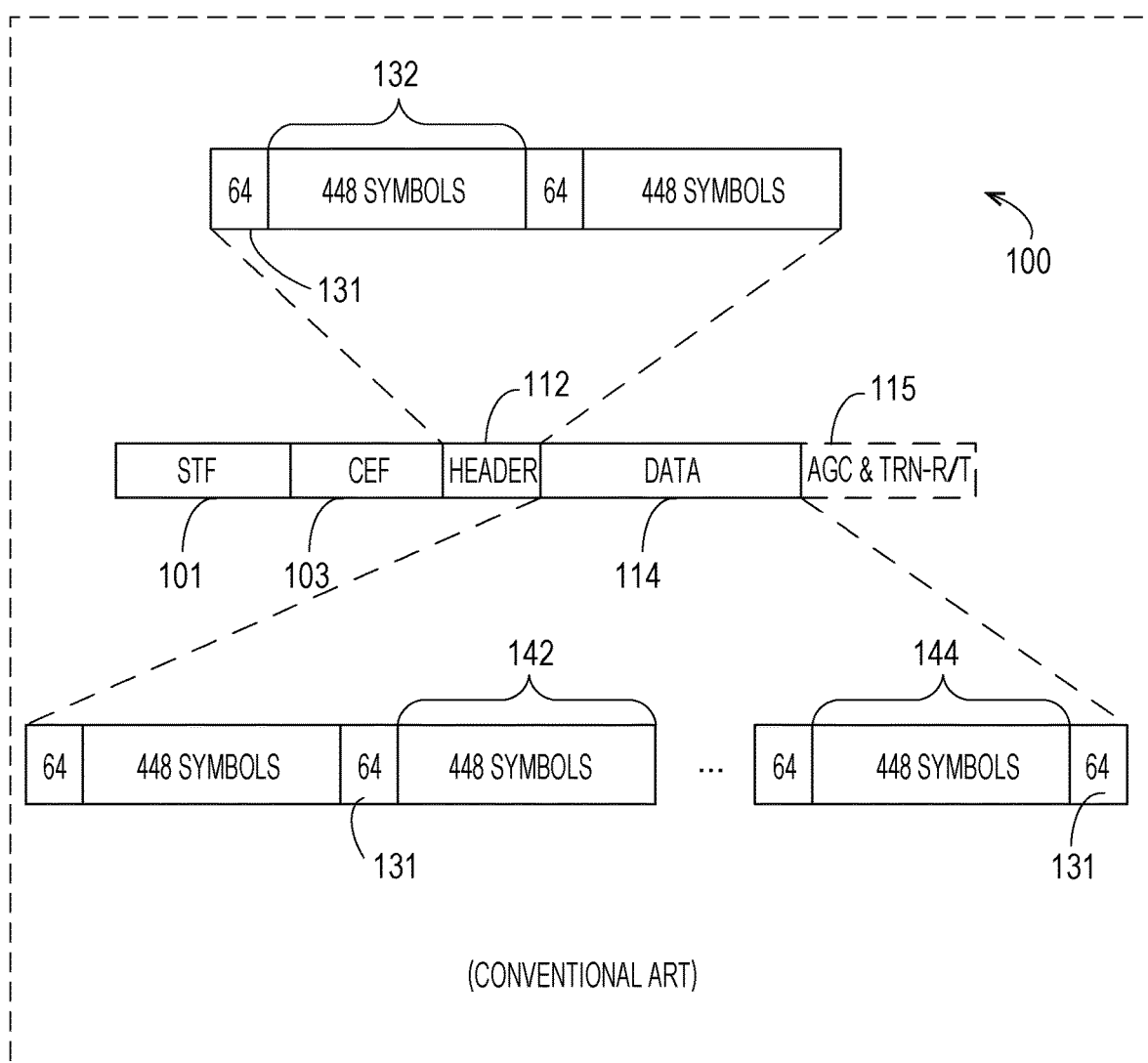
FIG. 1 is a diagram illustrating the format of an example SC PPDU according to the related art.

FIG. 1 illustrates the format of an example SC PPDU 100 according to the related art. The SC PPDU 100 includes a short training field (STF) 101, a channel estimation field (CEF) 103, a header 112, a data field 114 and optional AGC&TRN-R/T subfields 115. All the fields of the SC PPDU 100 are transmitted with a standard bandwidth of 2.16 GHz.

The STF 101 is used for packet detection, automatic gain control (AGC), frequency offset estimation and synchronization. The CEF 103 is used for channel estimation as well as indication of which of SC and OFDM modulations is going to be used for the SC PPDU 100. The header 112 includes a plurality of fields that define the details of the SC PPDU 100 to be transmitted, as illustrated in FIG. 2.

The data field 114 includes the payload data of the SC PPDU 100. The number of data octets in the data field 114 is specified by the Length field of the header 112, and the MCS (Modulation and Coding Scheme) used by the data field 114 is specified by the MCS field of the header 112.

The AGC&TRN-R/T subfields 115 are present only when the PPDU 100 is used for the purpose of beam refinement or tracking. The length of AGC&TRN-R/T subfields 115 is specified by the Training Length field of the header 112. Whether TRN-R field or TRN-T field is present is specified by the Packet Type field of the header 112.

Figure 3:
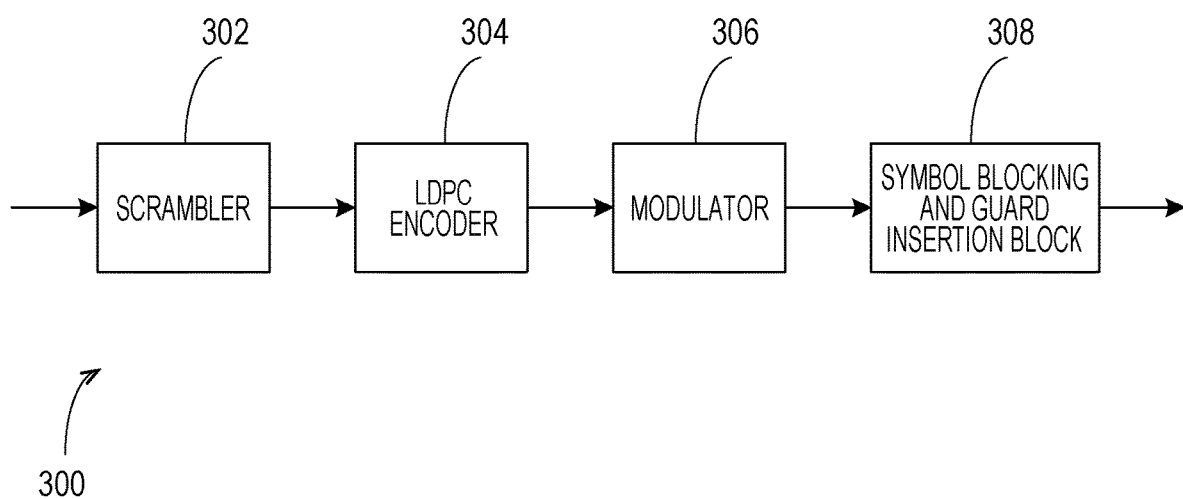
FIG. 3 is a block diagram illustrating an example transmitter for the header and the data field according to the related art.

FIG. 3 is a block diagram illustrating an example transmitter 300 for the header 112 and the data field 114 according to the related art. The transmitter 300 includes a scrambler 302, a low density parity check (LDPC) encoder 304, a modulator 306 and a symbol blocking and guard Insertion block 308. The scrambler 302 scrambles the bits of the header 112 and the data field 114. Note that a shift register included in the scrambler 302 is initialized according to the scrambler Initialization field of the header 112. The header 112 is scrambled starting from the bits of the MCS field following the scrambler Initialization field.

In the context of the header 112, the LDPC encoder 304 performs LDPC encoding on the scrambled bits of the header 112 according to a predetermined code rate and generates a sequence of coded bits. The modulator 306 converts the sequence of coded bits into a plurality of complex constellation points using π/2 binary phase shift keying (BPSK). The symbol blocking and guard Insertion block 308 generates two SC blocks from the plurality of complex constellation points. Each SC block (e.g., 132) includes 448 π/2-BPSK data symbols and is prepended by a guard interval 131 of 64 π/2-BPSK symbols generated from the predefined Golay sequence of length 64.

In the context of the data field 114, the LDPC encoder 304 performs LDPC encoding on the scrambled bits of the data field 114 according to a code rate which is specified by the MCS field of the header 112. The LDPC encoder 304 generates a sequence of coded bits, followed by padding bits if necessary. The modulator 306 converts the coded and padded bit stream into a stream of complex constellation points according to the modulation scheme specified by the MCS field of the header 112. The symbol blocking and guard Insertion block 308 generates a plurality of SC blocks from the stream of complex constellation points. Each SC block (e.g., 142) includes 448 data symbols and is prepended by the same guard interval 131. Furthermore, the final SC block 144 transmitted needs to be followed by the same guard interval 131 for ease of SC frequency domain equalization (FDE).

Figure 4:
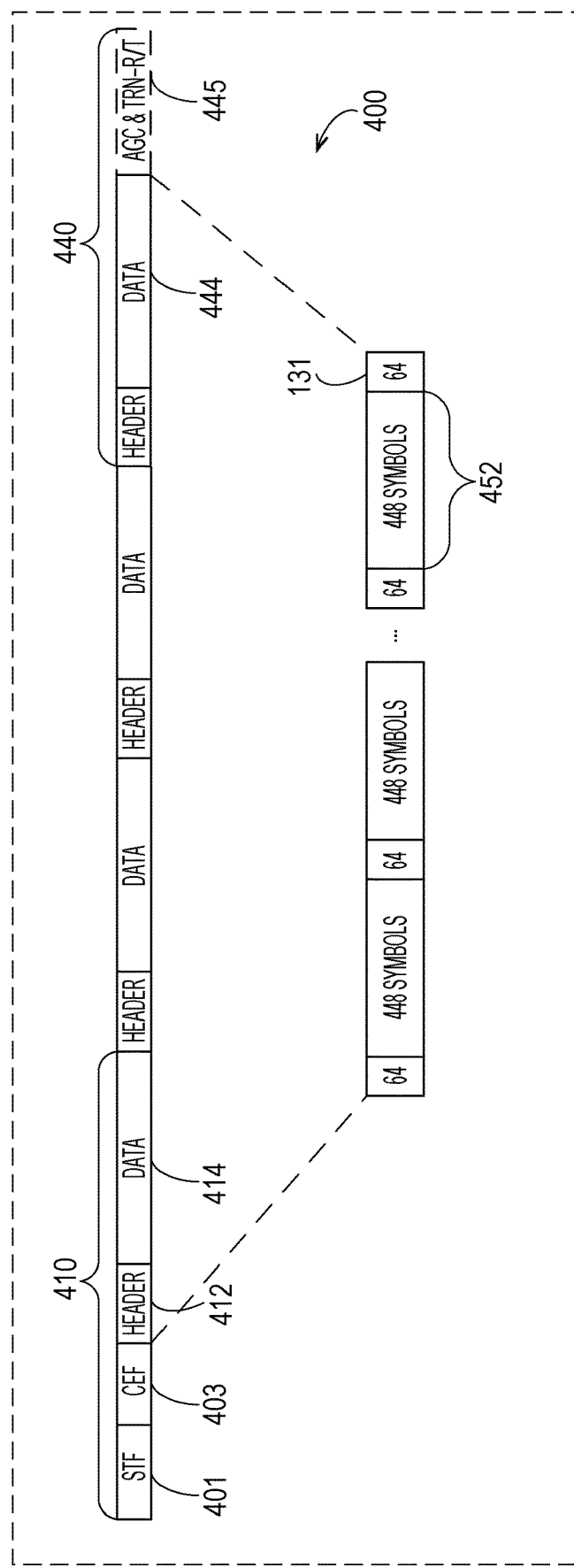
FIG. 4 is a diagram illustrating the format of an example aggregate SC PPDU according to the related art.

FIG. 4 illustrates the format of an example aggregate SC PPDU 400 according to the related art. The aggregate PPDU 400 includes four constituent SC PPDUs. Each of the four PPDUs in the aggregate SC PPDU 400 includes a header and a data field. For example, the PPDU 410 includes a header 412 and a data field 414. In addition, the PPDU 410 which is located at the beginning of the aggregate SC PPDU 400 includes the STF 401 and the CEF 403 as well. And the SC PPDU 440 which is located at the end of the aggregate SC PPDU 400 includes optional AGC & TRN-R/T subfields 445 as well. Notice that there are no IFS, preamble and separation between PPDU transmissions in the aggregate SC PPDU 400.

According to the related art, the STF 401, the CEF 403, each of the headers (e.g., 412), each of the data fields (e.g., 414) and the AGC&TRN-T/R subfield 445 in the aggregate SC PPDU 400 are defined in the exactly same manner as their respective counterparts in the SC PPDU 100 in FIG. 1.

According to the related art, the final SC block transmitted as a data field, except the last data field 444, is followed by the first SC block transmitted as a header. So, only the final SC block 452 within the last SC PPDU 440 needs to be post-pended by the same guard interval 131.

Figure 5:
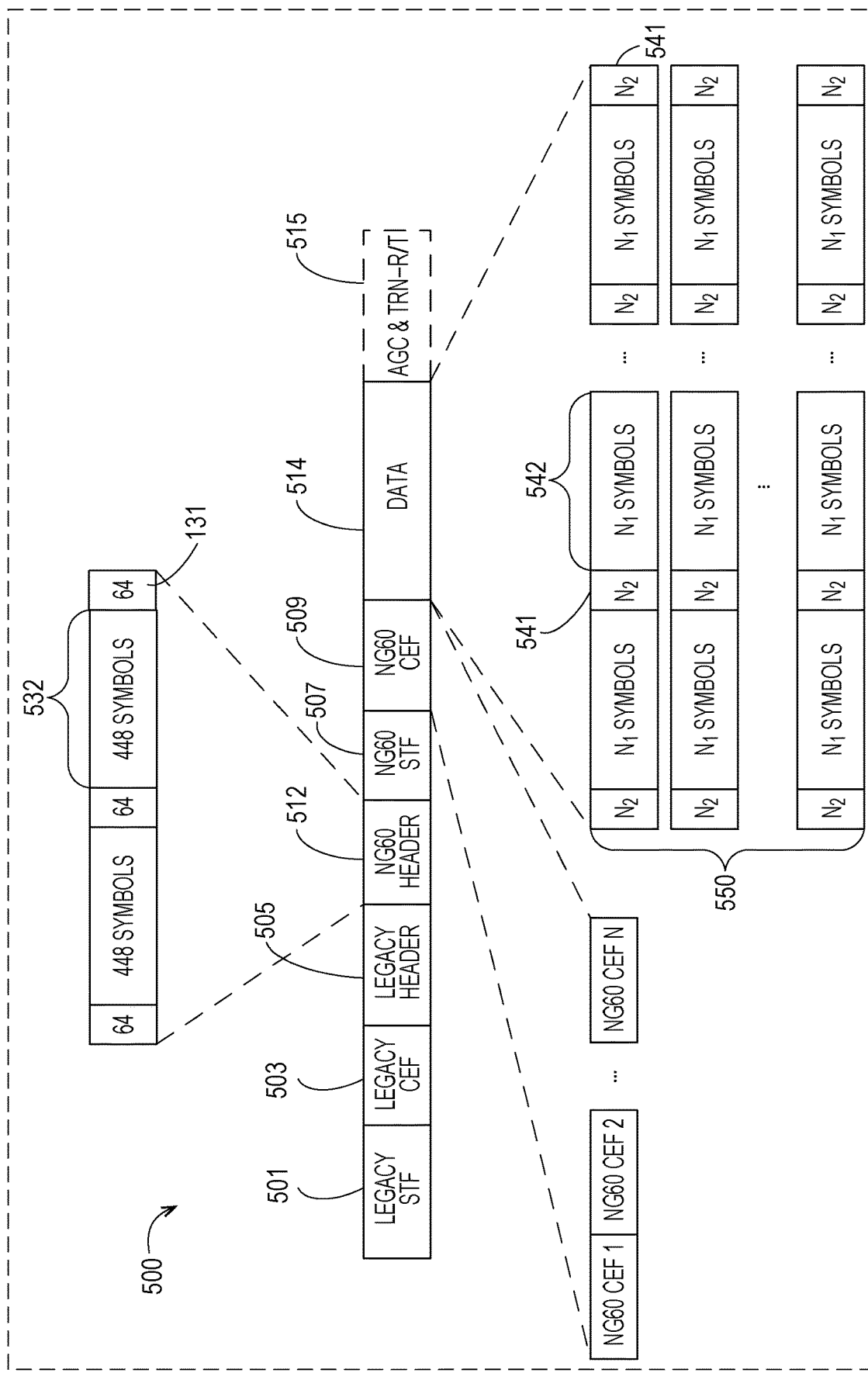
FIG. 5 is a diagram illustrating the format of an example MF SC PPDU according to the present disclosure.

FIG. 5 illustrates the format of an example of MF SC PPDU 500 according to the present disclosure. The MF PPDU 500 includes a legacy STF 501, a legacy CEF 503, a legacy header 505, a NG60 header 512, a NG60 STF 507, a plurality of NG60 CEFs 509, a data field 514 and optional AGC&TRN-R/T subfields 515.

The legacy STF 501, the legacy CEF 503 and the legacy header 505 are defined in the exactly same manner as their respective counterparts in FIG. 1.

The NG60 header 512 defines the details of the MF SC PPDU 500 to be transmitted. The example fields of the NG60 header 512 are illustrated in FIG. 6. The data field 514 consists of the payload data of the MF SC PPDU 500. Space-time block coding (STBC) or MIMO spatial multiplexing may be applied to the data field 514, which results in a plurality of space-time streams (STSs) in the data field 514. The number of STSs in the data field 514 is specified in the $N_{sts}$ field of the NG60 header 512.

The NG60 STF 507 is used for retraining AGC only. The plurality of NG60 CEFs 509 is used for channel estimation for the plurality of STSs in the data field 514. Note that the number of NG60 CEFs 509 depends on the number of STSs in the data field 514. In one embodiment, the number of NG60 CEFs 509 shall not be smaller than the number of STSs in the data field 514. For example, if the number of STSs in the data field 514 is 2, the number of NG60 CEFs 509 can be set to 2. If the number of STSs in the data field 514 is 3, the number of NG60 CEFs 509 can be set to 4.

Figure 7:
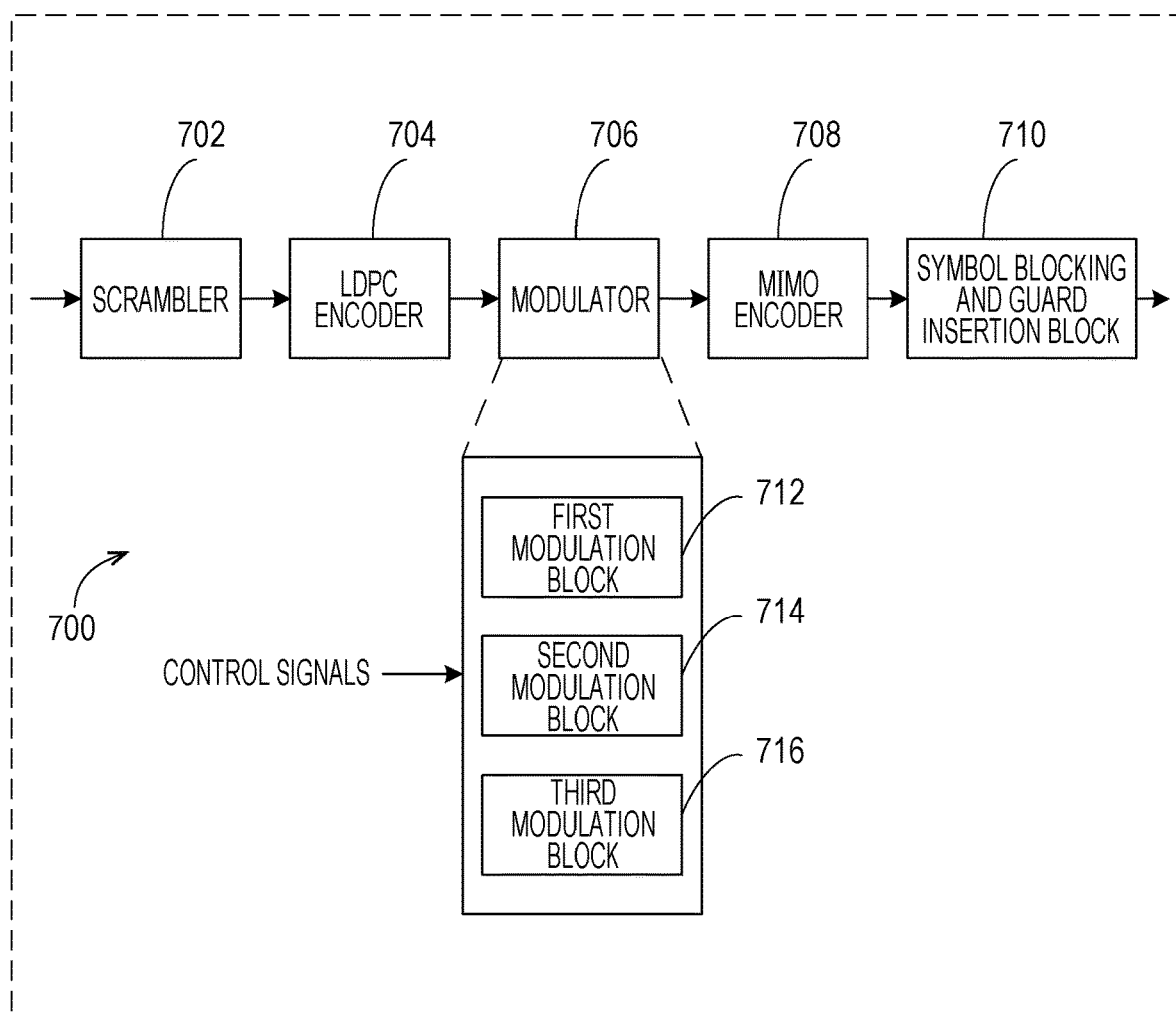
FIG. 7 is a block diagram illustrating an example Tx baseband processor for the NG60 header and the data field of the MF SC PPDU according to the present disclosure.

FIG. 7 is a block diagram illustrating an example Tx baseband processor 700 for the NG60 header 512 and the data field 514 of the MF SC PPDU 500. The Tx baseband processor 700 includes a scrambler 702, a LDPC encoder 704, a modulator 706, a MIMO encoder 708 and a symbol blocking and guard Insertion block 710. The modulator 706 includes a first modulation functional block 712, a second modulation functional block 714 and a third modulation functional block 716.

The bits of the NG60 header 512 are prepended to the bits of the data field 514 and passed into the scrambler 702. The scrambler 702 scrambles the bits of the NG60 header 512 and the data field 514 according to a predefined scrambling rule. Note that the shift register included in the scrambler 702 is initialized according to the scrambler Initialization field in the NG60 header 512. The NG60 header 512 is scrambled starting from the bits of the MCS field following the scrambler Initialization field, and the scrambling of the data field 514 follows the scrambling of the NG60 header 512 with no reset.

In the context of the NG60 header 512, the LDPC encoder 704 performs LDPC encoding on the scrambled bits of the NG60 header 512 according to a predetermined code rate and generates a sequence of coded bits. The second modulation functional block 714 inside the modulator 706 converts the sequence of coded bits into a stream of complex constellation points using π/2-BPSK with a phase rotation of 90 degrees. The symbol blocking and guard Insertion block 710 generates two SC blocks from the stream of complex constellation points. Each SC block includes 448 data symbols and is prepended by the same guard interval 131. In addition, the final SC block 532 within the NG60 header 512 needs to be followed by the same guard interval 131.

Figure 15:
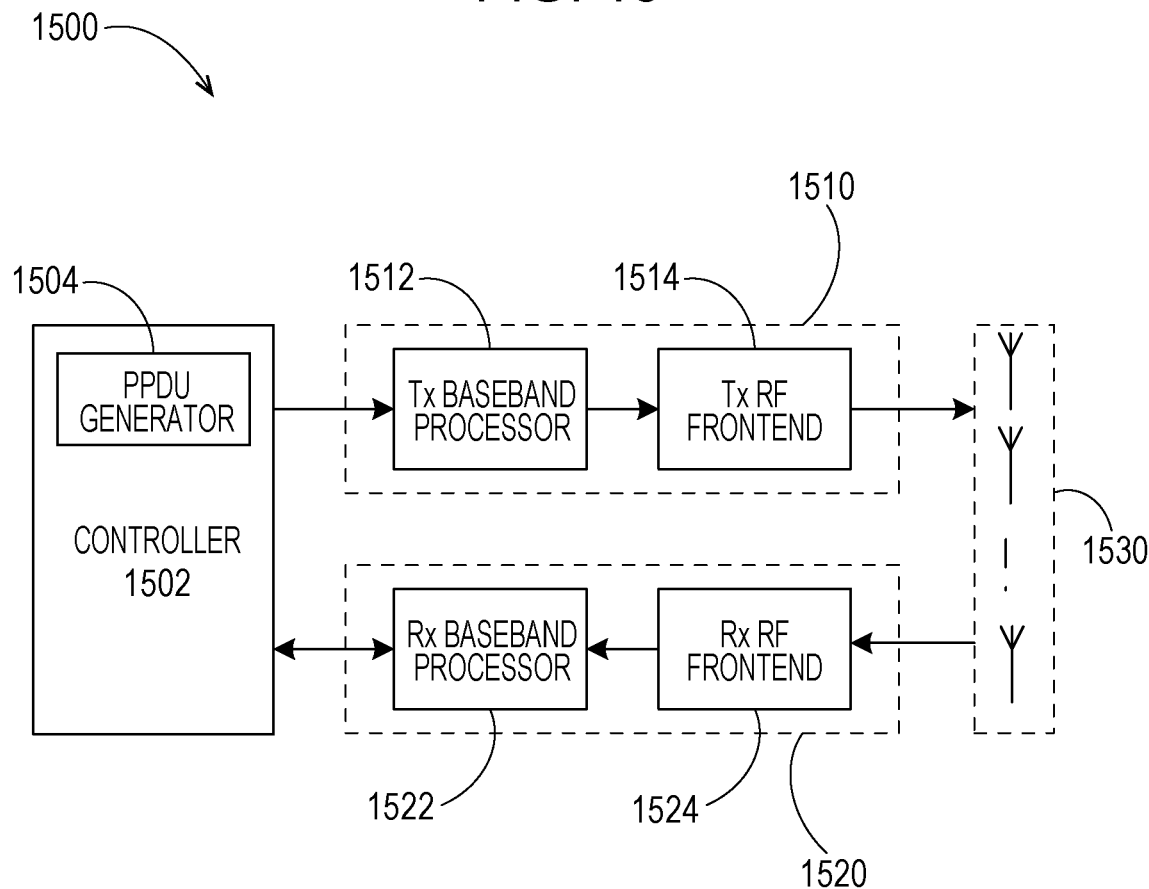
FIG. 15 is a block diagram illustrating example architecture of a wireless communication apparatus according to the present disclosure.

In the context of the data field 514, the LDPC encoder 704 performs LDPC encoding on the scrambled bits of the data field 514 according to a code rate which is specified by the MCS field of the NG60 header 512 and generates a sequence of coded bits, followed by padding bits if necessary. The third modulation functional block 716 in the modulator 706 converts the coded and padded bit stream into a stream of complex constellation points according to the modulation scheme specified by the MCS field of the NG60 header 512. Notice that the first modulation functional block 712 inside the modulator 706 is used for the modulation of the legacy header 505. Which one of the first modulation functional block 712, the second modulation functional block 714 and the third modulation functional block 716 inside the modulator 706 is used is determined according to a control signal generated by the controller 1502 as illustrated in FIG. 15. The MIMO encoder 708 applies the MIMO encoding to the stream of complex constellation points and obtains a plurality of STSs 550. For each STS, the symbol blocking and guard Insertion block 710 generates a plurality of SC blocks. The number of SC blocks per STS is the same. Each SC block (e.g., 542) includes $N_1$ data symbols and is prepended by a guard interval 541 of $N_2$ π/2-BPSK symbols generated from the predefined Golay sequence of length $N_2$, where $N_1$ and $N_2$ are positive integers and $N_1$ should be an integer multiple of $N_2$. The values of $N_1$ and $N_2$ may be configurable and indicated in the NG60 header 512. Furthermore, for each STS, the final SC block transmitted needs to be followed by the same guard interval 541.

According to the present disclosure, since the legacy header 505 of the MF SC PPDU 500 has the exactly same format and Tx processing as the header 112 of the SC PPDU 100, a legacy WiGig device is able to decode the legacy header 505 of the MF SC PPDU 500 correctly.

According to the present disclosure, the NG60 header 512 of the MF SC PPDU 500 is modulated using π/2-BPSK with a phase rotation of 90 degrees, which is different from a phase rotation of the legacy header 505. Due to such modulation difference, a NG60 device is able to determine whether the received SC PPDU is MF or LF.

According to the present disclosure, a legacy WiGig device would process the received MF SC PPDU 500 in the same manner as the SC PPDU 100. In other words, the legacy WiGig device would envision the NG60 header 512, the NG60 STF 507 and the NG60 CEFs 509 as a part of the PHY service data unit (PSDU). In order for the legacy WiGig device to determine the actual transmission time of the PSDU correctly, the values of the MCS field and the Length field of the legacy header 505 shall be appropriately set.

Figure 8:
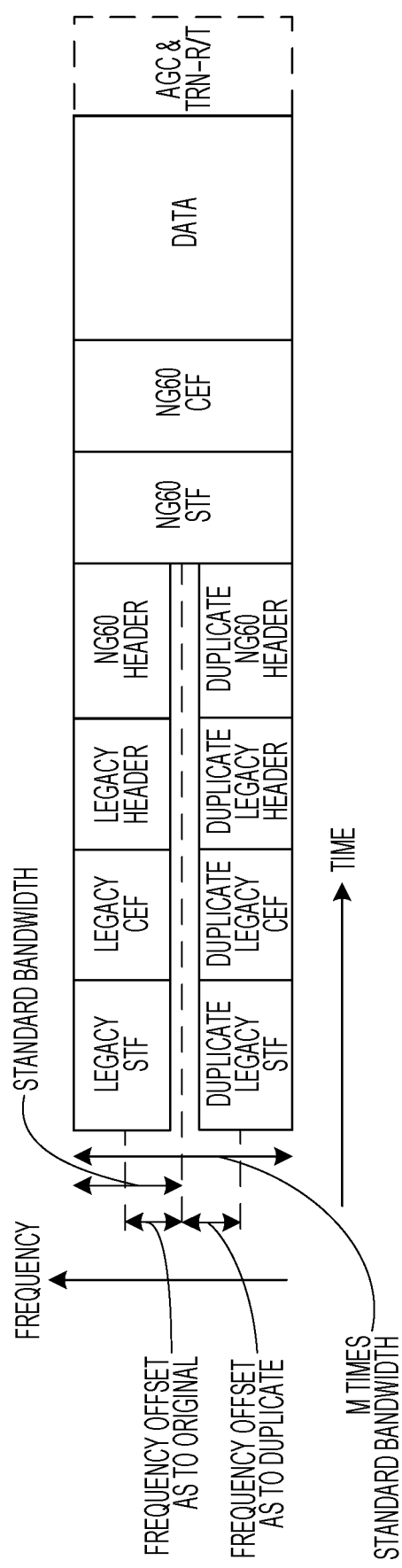
FIG. 8 is a diagram illustrating transmission of the example MF SC PPDU in a channel where channel bandwidth is two times of standard bandwidth according to the present disclosure.

According to the present disclosure, a NG60 device is able to know the channel bandwidth information only after it successfully decodes the NG60 header 512. As a result, the NG60 STF 507, the plurality of NG60 CEFs 509, the data field 514 and the optional AGC&TRN-R/T subfields 515 can be transmitted with variable bandwidth. However, the legacy STF 501, the legacy CEF 503, the legacy header 505 and the NG60 header 512 can be transmitted with standard bandwidth only. In a channel with a channel bandwidth of M multiples of standard bandwidth, M copies of the legacy STF 501, the legacy CEF 503, the legacy header 505 and the NG60 header 512 can be transmitted with standard bandwidth in the channel simultaneously after an appropriate frequency offset is applied to each of these M copies. FIG. 8 is a diagram illustrating transmission of the MF SC PPDU 500 in a channel where channel bandwidth is two times of standard bandwidth. As shown in FIG. 8, the frequency offset for the original legacy STF, legacy CEF, legacy header and NG60 header can be set to 50% of standard bandwidth and the frequency offset for the duplicated legacy STF, legacy CEF, legacy header and NG60 header can be set to −50% of standard bandwidth.

FIG. 9 is a block diagram illustrating an example Rx baseband processor 900 for receiving the MF SC PPDU 500 according to the present disclosure. The Rx baseband processor 900 includes a symbol unblocking and guard removal block 902, a MIMO decoder 904, a demodulator 906, a LDPC decoder 908, a descrambler 910 and a channel estimator 912. Note that the MIMO Decoder 904 is only applicable to decoding of the data field 514.

The symbol unblocking and guard removal block 902 performs the inversion operation with respect to the symbol blocking and guard insertion block 710 on the received SC MF PPDU 500.

The NG60 header 512 needs to be decoded first. For this purpose, the demodulator 906 performs the inversion operation with respect to the modulator 706 based on the channel estimates obtained by the channel estimator 912 from the legacy CEF 503. In more details, the second demodulation functional block 916 is applied to the portion corresponding to the NG60 header 512. After that the LDPC Decoder 908 and the descrambler 910 perform the inversion operation with respect to the LDPC encoder 704 and the scrambler 702, respectively, resulting in the decoded bits of the legacy header 505 and the NG60 header 512.

After decoding the NG60 header 512, the Rx baseband processor 900 proceeds to decode the data field 514 based on the information of the NG60 header 512. The MIMO Decoder 904 performs the inversion operation with respect to the MIMO encoder 708 on the portion of the received MF SC PPDU 500 corresponding to the data field 514 based on the channel estimates obtained by the channel estimator 912 from the NG60 CEFs 509. The demodulator 906 performs the inversion operation with respect to the modulator 706. In more details, the third demodulation functional block 918 is applied to the portion corresponding to the data field 514. Notice that the first demodulation functional block 914 inside the demodulator 906 is used for the demodulation of the received legacy header 505. Which one of the first demodulation functional block 914, the second demodulation functional block 916 and the third demodulation functional block 918 is used is determined according to a control signal generated by the controller 1502 as shown in FIG. 15. After that the LDPC Decoder 908 and the descrambler 910 perform the inversion operation with respect to the LDPC encoder 704 and the scrambler 702, respectively, resulting in the decoded bits of the data field 514.

First Embodiment

Figure 10A:
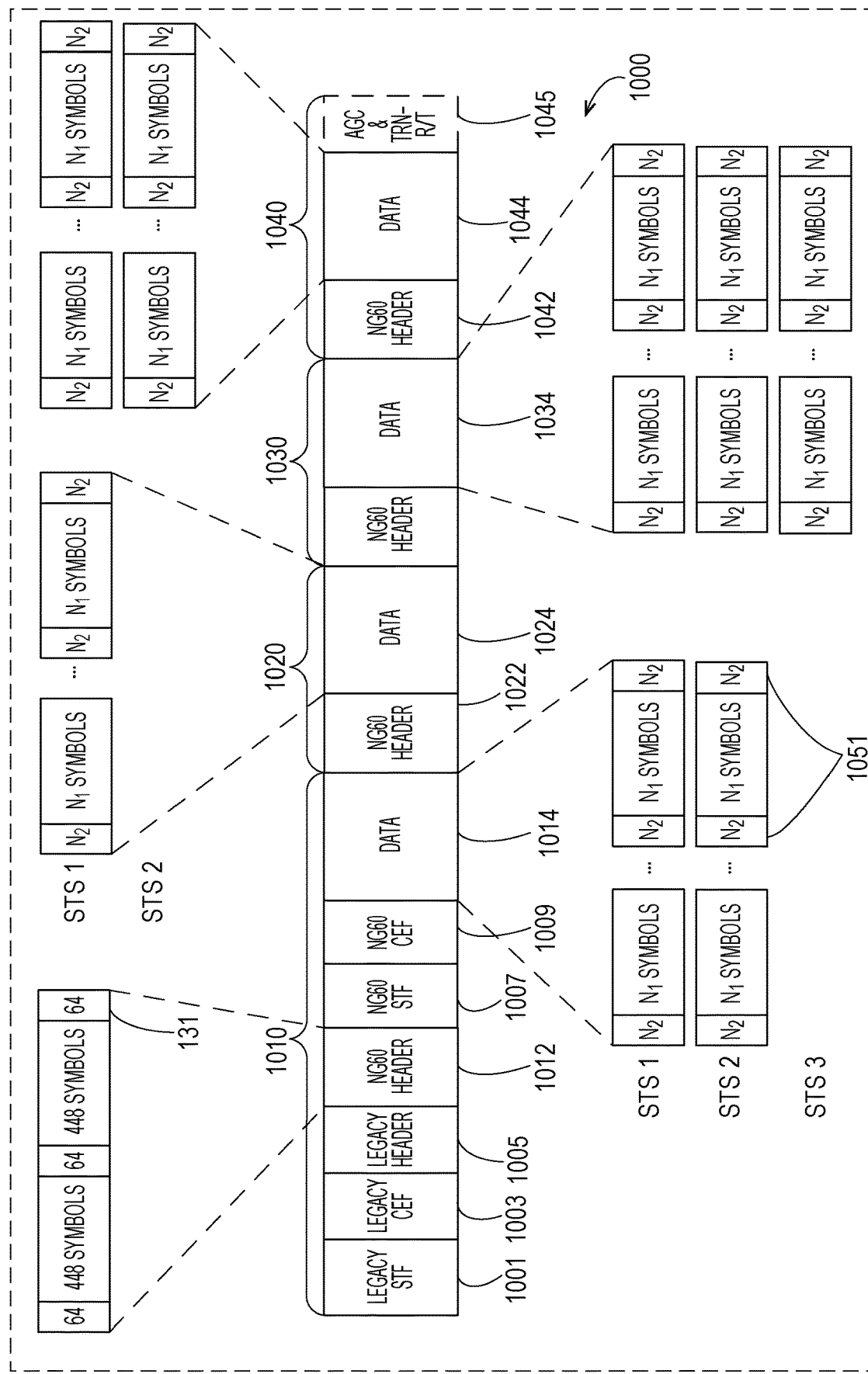
FIG. 10A illustrates the format of an example aggregate MF SC PPDU according to a first embodiment of the present disclosure.
Figure 10B:
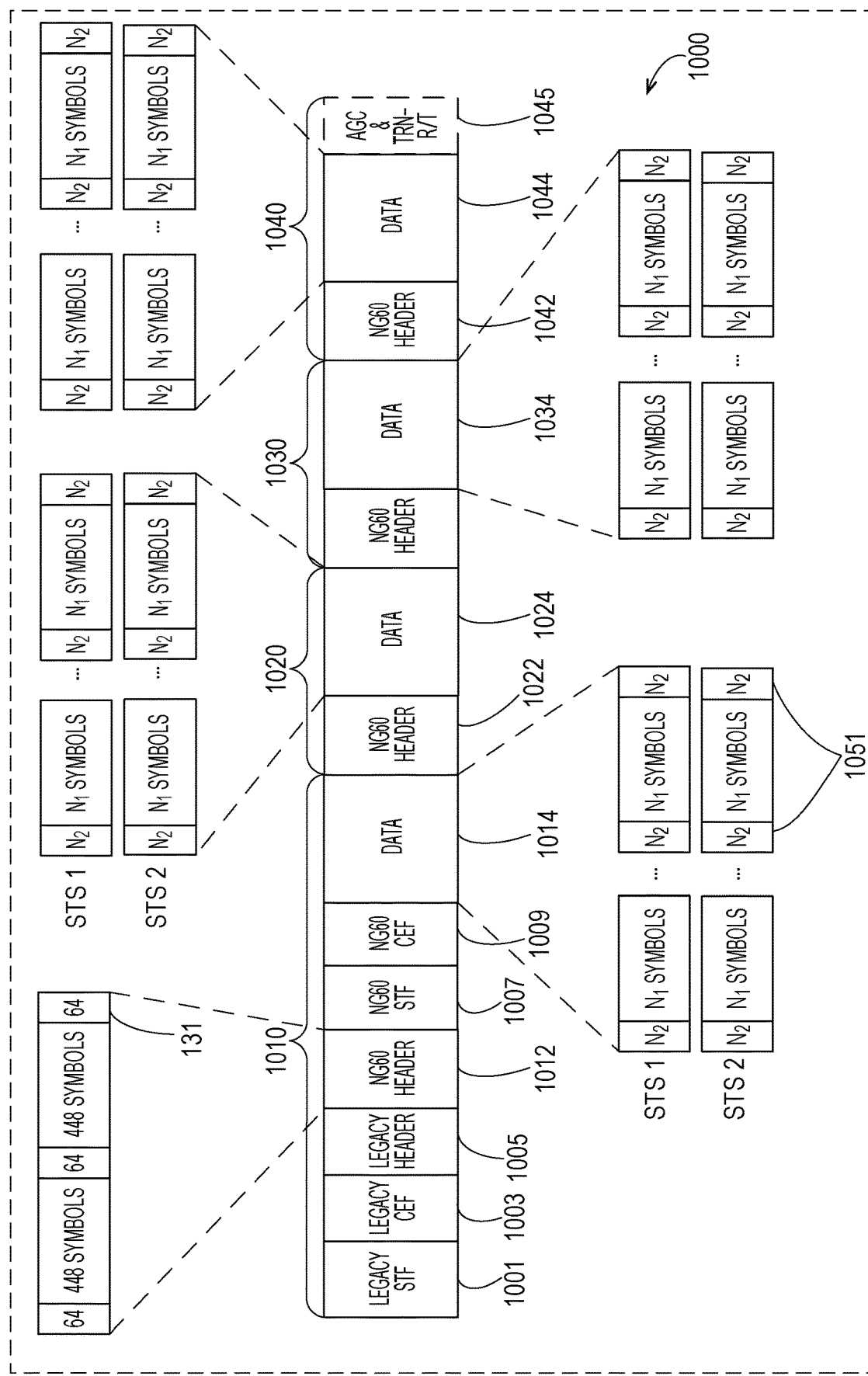
FIG. 10B illustrates the format of an example aggregate MF SC PPDU according to the first embodiment of the present disclosure.

FIGS. 10a and 10b illustrate a format of an example of an aggregate MF SC PPDU 1000 according to a first embodiment of the present disclosure. The aggregate MF SC PPDU 1000 includes four MF SC PPDUs. Each of the four MF SC PPDUs includes a NG60 header and a data field. For example, the first MF SC PPDU 1010 includes a NG60 header 1012 and a data field 1014. The first MF SC PPDU 1010 which is located at the beginning of the aggregate MF SC PPDU 1000 further includes a legacy STF 1001, a legacy CEF 1003, a legacy header 1005, a NG60 STF 1007 and a plurality of NG60 CEFs 1009. The second MF SC PPDU 1020 which is located next to the first MF SC PPDU 1010 includes a NG60 header 1022 and a data field 1024. The last MF SC PPDU 1040 which is located at the end of the aggregate MF SC PPDU 1000 further includes optional AGC & TRN-R/T subfields 1045. Notice that there are no IFS, preamble and separation between MF PPDU transmissions in the aggregate MF SC PPDU 1000. So compared with individual transmission of normal MF SC PPDUs 500, transmission efficiency is improved.

According to the first embodiment of the present disclosure, all of the data fields in the aggregate MF SC PPDU 1000 have the same transmission bandwidth. In one embodiment, the number of STSs $N_{sts}$ for the data fields in the aggregate MF SC PPDU 1000 may be different. For example, as shown in FIG. 10A, each of the data field 1014 and the data field 1044 has two STSs, while the data field 1024 has a single STS and the data field 1034 has three STSs. In this case, the number of NG60 CEFs 1009 depends on the maximum number of STSs among all of the data fields in the aggregate MF SC PPDU 1000. For example, if the maximum number of STSs among all of the data fields is 2, the number of NG60 CEFs 1009 can be set to 2. If the maximum number of STSs among all of the data fields is 3, the number of NG60 CEFs 1009 can be set to 4. In another embodiment, the number of STSs $N_{sts}$ for the data fields in the aggregate MF SC PPDU 1000 may be the same. For example, as shown in FIG. 10B, each of the data fields has two STSs.

Figure 11:
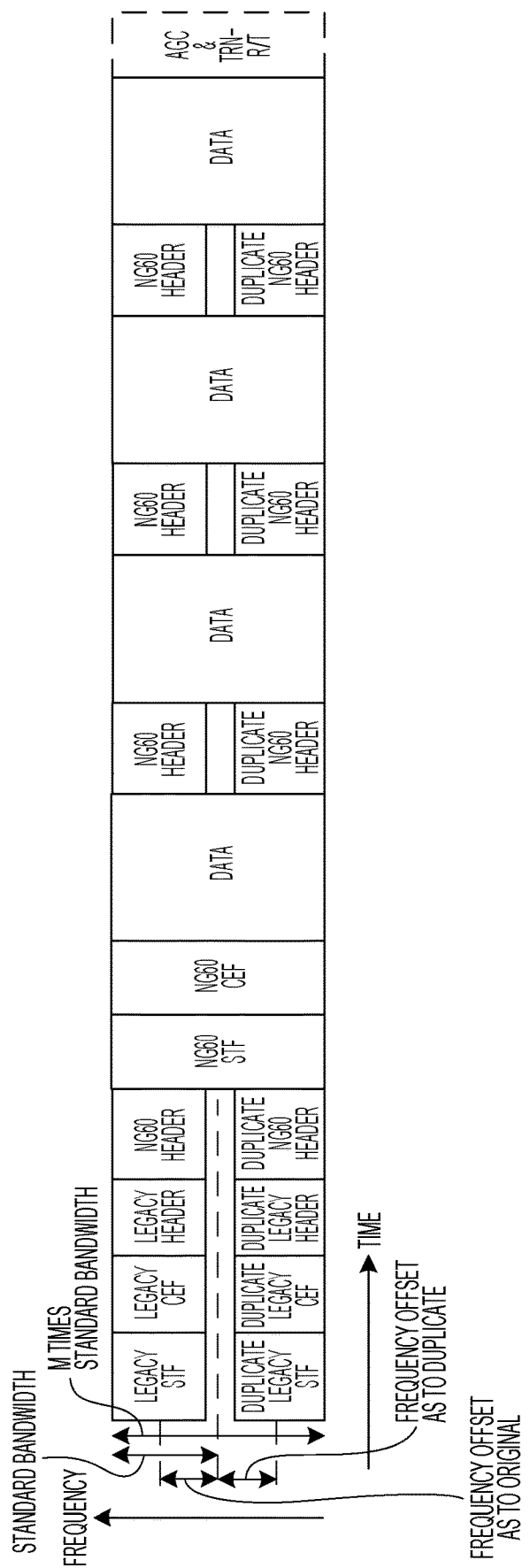
FIG. 11 is a diagram illustrating transmission of the example aggregate MF SC PPDU in a channel where channel bandwidth is two times of standard bandwidth according to the first embodiment of the present disclosure.

According to the first embodiment of the present disclosure, the NG60 STF 1007, the plurality of NG60 CEFs 1009, each of the data fields (e.g., 1014) and the optional AGC & TRN-R/T subfields 1045 can be transmitted with variable bandwidth. However, the legacy STF 1001, the legacy CEF 1003, the legacy header 1005 and each of the NG60 headers (e.g., 1012) can be transmitted with standard bandwidth only. FIG. 11 is a diagram illustrating transmission of the aggregated MF SC PPDU 1000 in a channel where channel bandwidth is two times of standard bandwidth. As shown in FIG. 11, each of the original legacy STF, the original legacy CEF, the original legacy header and all of the original NG60 headers are duplicated in a frequency domain. Here, the frequency offset for the original legacy STF, the original legacy CEF, the original legacy header and all of the original NG60 headers can be set to 50% of the standard bandwidth. And the frequency offset for the duplicated legacy STF, the duplicated legacy CEF, the duplicated legacy header and all of the duplicated NG60 headers can be set to −50% of the standard bandwidth.

According to the first embodiment of the present disclosure, for all of the data fields in the aggregate MF SC PPDU 1000, each SC block includes the same number of data symbols and is prepended by the same guard interval 1051.

According to the first embodiment of the present disclosure, since a NG60 header may have a transmission bandwidth different from a transmission bandwidth of its following data field, the final SC block transmitted as every NG60 header in the aggregate MF SC PPDU 1000 needs to be followed by the same guard interval 131. Consequently, the number of required post-pended guard intervals for the NG60 headers is 4. The final SC block per STS transmitted of every data field in the aggregate MF SC PPDU 1000 needs to be followed by the same guard interval 1051. Consequently, the number of required post-pended guard intervals for the data fields is 8.

According to the first embodiment of the present disclosure, the Tx baseband processor 700 for transmitting the MF SC PPDU 500 can be easily adapted for transmitting the aggregate MF SC PPDU 1000. Similarly, the Rx baseband processor 900 for receiving the MF SC PPDU 500 can be easily adapted for receiving the aggregated MF SC PPDU 1000. Notice that the channel estimates obtained by the channel estimator 912 from the legacy CEF 1003 can be used for decoding all of the NG60 headers 1012, 1022, 1032 and 1042 in the received aggregate MF SC PPDU 1000.

The channel estimates obtained by the channel estimator 912 from the NG60 CEFs 1009 can be used for decoding all of the data fields 1014, 1024, 1034 and 1044 in the received aggregate MF SC PPDU 1000. As a result, compared with individual transmission and reception of normal MF PPDUs 500, transmission and reception of the aggregate MF SC PPDU 1000 does not incur extra implementation complexity.

According to the first embodiment of the present disclosure, a legacy STA is able to decode the legacy header 1005 but cannot decode the remaining of the aggregate MF SC PPDU 1000. In order for the legacy STA to estimate transmission time of the aggregated MF SC PPDU 1000 correctly to avoid packet collision, the additional PPDU field in the legacy header 1016 shall be set to 0. In other words, the aggregate MF SC PPDU 1000 shall be envisioned by the legacy STA as a normal legacy PPDU 100 instead of legacy aggregate SC PPDU 400. In addition, the MCS field and the Length field in the legacy header 1005 shall be appropriately set so that the transmission time calculated by the legacy STA is the same as the actual transmission time of the equivalent data field, which includes the NG60 STF 1007, the NG60 CEFs 1009, all of the NG60 headers and all of the data fields in the aggregate MF SC PPDU 1000. In other words, a total packet length of the NG60 STF 1007, the NG60 CEFs 1009, all of the NG60 headers and all of the data fields is set as the Length field in the legacy header 1005.

According to the first embodiment of the present disclosure, a legacy STA is able to calculate the actual transmission time of the equivalent data field of the aggregate MF SC PPDU 1000, by decoding the legacy header 1005. Accordingly, in a case where the clock frequency error between the central coordinator such as an access point or PCP and a legacy STA is extremely small, the additional PPDU field in the legacy header 1005 can be set to 1.

Figure 16:
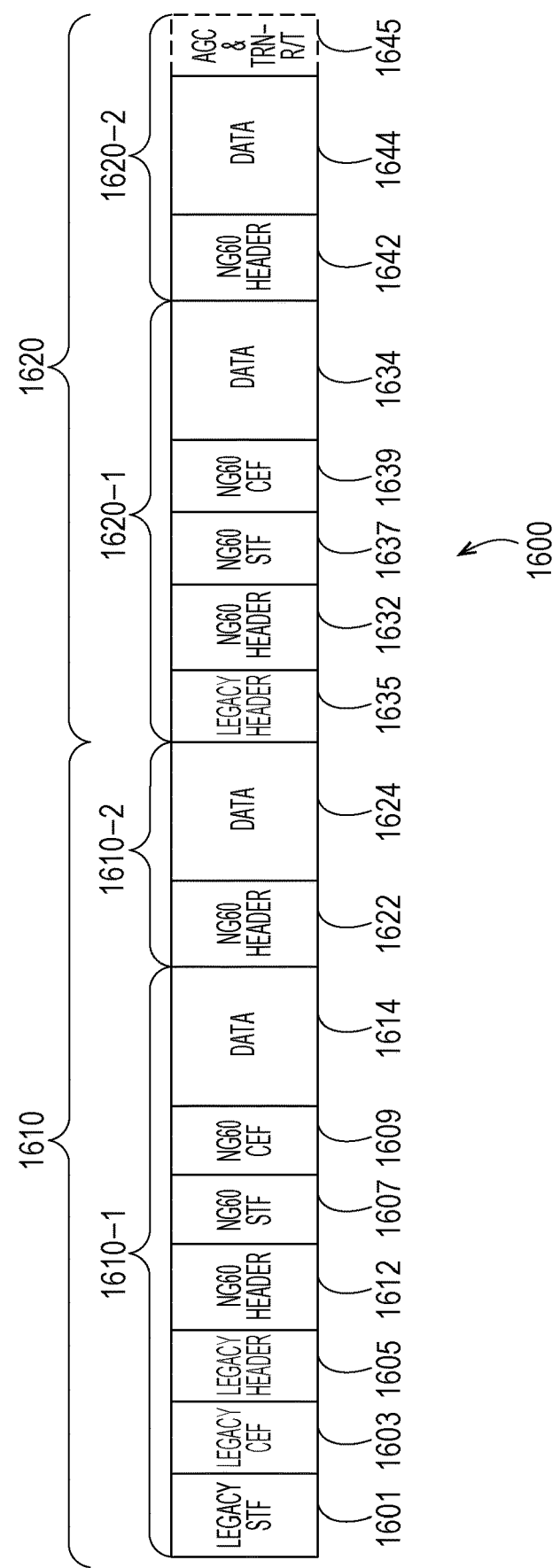
FIG. 16 is a diagram illustrating the format of an example component aggregate MF SC PPDU where a plurality of aggregate MF SC PPDUs have further been aggregated, according to the first embodiment.

FIG. 16 is a diagram illustrating the format of aggregate MF SC PPDU 1600 where a plurality of (e.g., two) component aggregate MF SC PPDUs of which the data fields all have the same transmission bandwidth, have been linked. As illustrated in FIG. 16, the aggregate MF SC PPDU 1600 includes a first component aggregate MF SC PPDU 1610 located at the beginning, and a second component aggregate MF SC PPDU 1620 located at the end. The first component aggregate MF SC PPDU 1610 includes a first MF SC PPDU 1610-1 located at the beginning, and a second MF SC PPDU 1610-2 located at the end. The second component aggregate MF SC PPDU 1620 includes a third MF SC PPDU 1620-1 located at the beginning, and a fourth MF SC PPDU 1620-2 located at the end. Each of the MF SC PPDUs 1610-1, 1610-2, 1620-1, and 1620-2 includes an NG60 header and data field. For example, the first MF SC PPDU 1610-1 includes an NG60 header 1612 and data field 1614. The first MF SC PPDU 1610-1 further includes a legacy STF 1601, legacy CEF 1603, legacy header 1605, NG60 STF 1607, and a plurality of NG60 CEFs 1609. The third MF SC PPDU 1620-1 further includes a legacy header 1635, an NG60 STF 1637, and a plurality of NG60 CEFs 1639. The fourth MF SC PPDU 1620-2 further includes optional AGC&TRN-R/T subfields 1645. Notice that there are no IFS, preamble and separation between component aggregate MF SC PPDU transmissions in the aggregate MF SC PPDU 1600.

Figure 17:
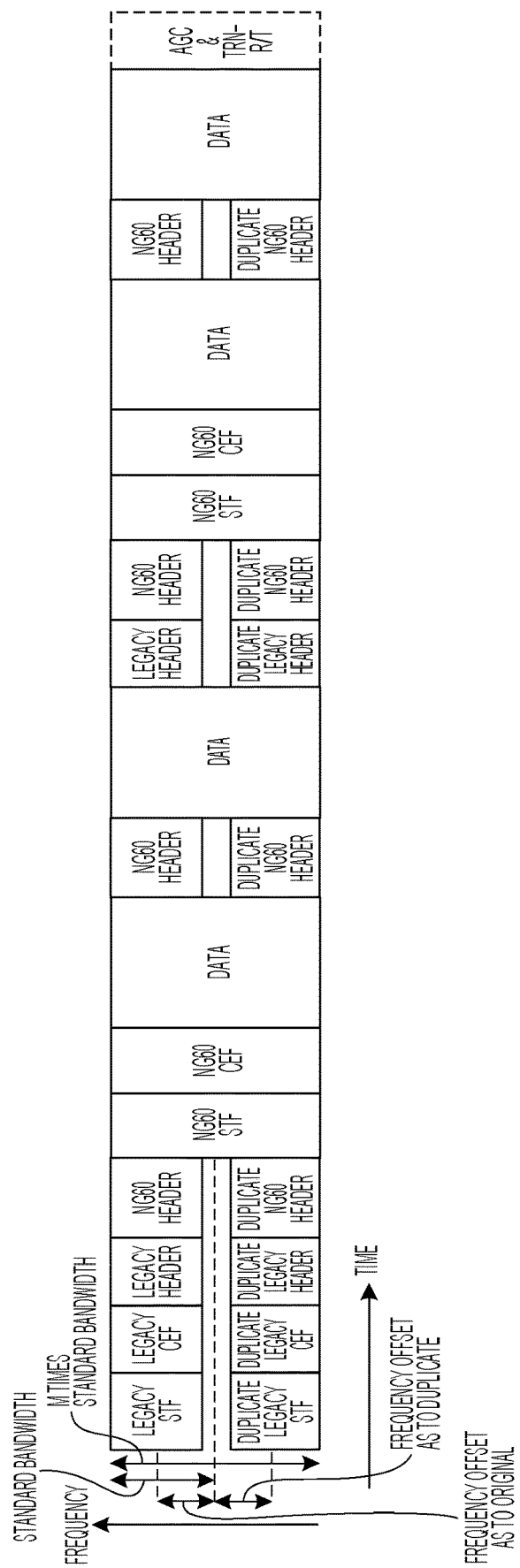
FIG. 17 is a diagram illustrating transmission of an example component aggregate MF SC PPDU where a plurality of aggregate MF SC PPDUs have further been aggregated, on a channel where the channel bandwidth is two times the standard bandwidth, according to the first embodiment.

FIG. 17 is a diagram illustrating transmission of the aggregate MF SC PPDU 1600 on a channel where the channel bandwidth is two times the standard bandwidth. The original legacy STF, original legacy CEF, original legacy header, and original NG60 header are each duplicated in the frequency region, as illustrated in FIG. 17. Accordingly, the frequency offset as to the original legacy STF, original legacy CEF, original legacy header, and all original NG60 headers, can be set to 50% of the standard bandwidth. Further, the frequency offset as to the duplicated legacy STF, duplicated legacy CEF, duplicated legacy header, and all duplicated NG60 headers, can be set to −50% of the standard bandwidth.

The ideas and concepts disclosed in this embodiment can be implemented for formatting and transmission of MF OFDM PPDUs.

Second Embodiment

Figure 12:
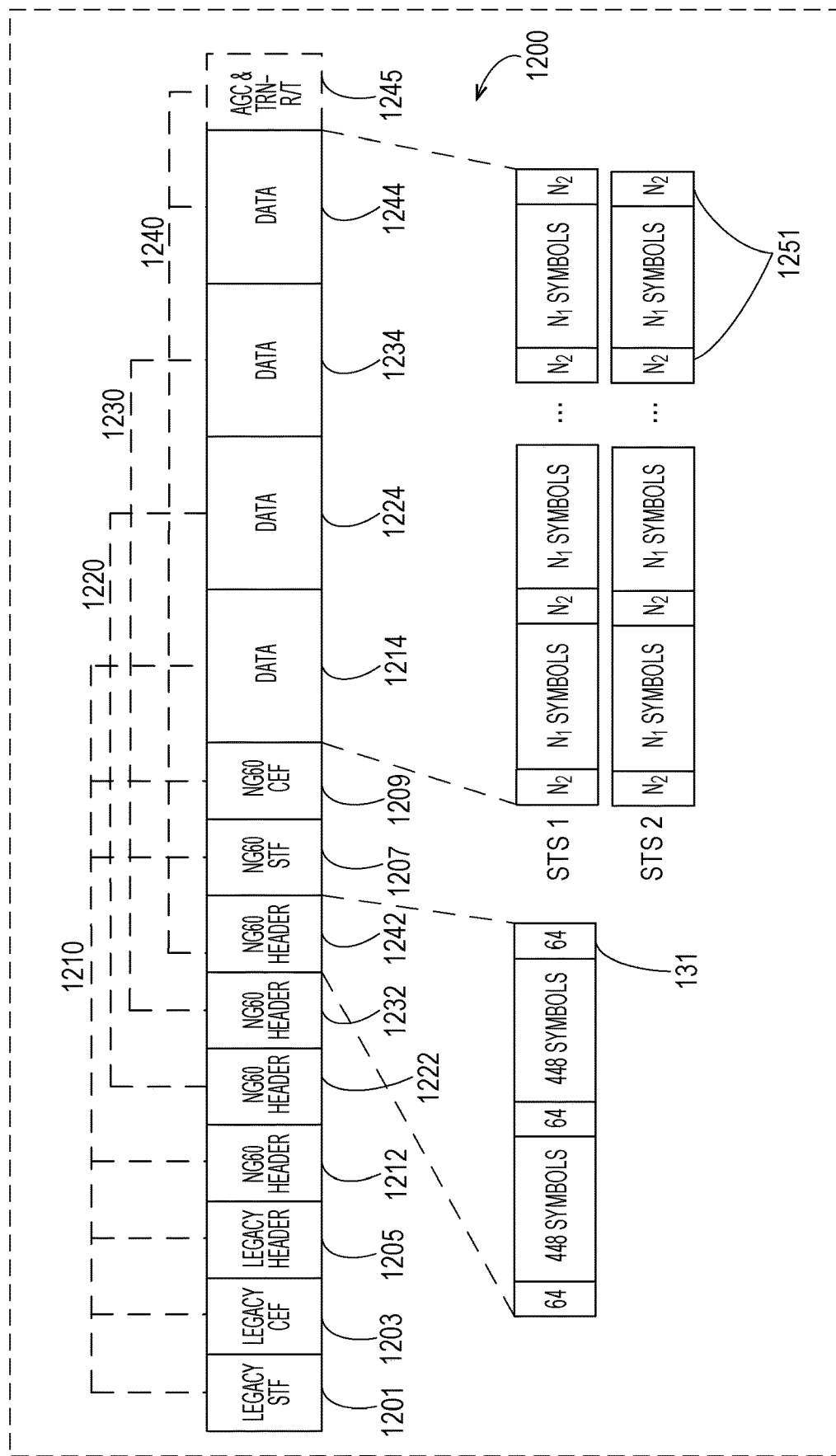
FIG. 12 illustrates the format of an example aggregate MF SC PPDU according to a second embodiment of the present disclosure.

FIG. 12 illustrates the format of another example of an aggregate MF SC PPDU 1200 according to a second embodiment of the present disclosure. The aggregate SC PPDU 1200 includes four MF SC PPDUs 1210, 1220, 1230 and 1240. Each of the four MF SC PPDUs includes a NG60 header and a data field. For example, the MF SC PPDU 1210 includes a NG60 header 1212 and a data field 1214. The first MF SC PPDU 1210 which is located at the beginning of the aggregate MF SC PPDU 1200 further includes a legacy STF 1201, a legacy CEF 1203, a legacy header 1205, a NG60 STF 1207 and a plurality of NG60 CEFs 1209. The last SC MF SC PPDU 1240 which is located at the end of the aggregate MF SC PPDU 1200 further includes optional AGC&TRN-R/T subfields 1245. Notice that there are no IFS, preamble and separation between MF SC PPDU transmissions in the aggregate MF SC PPDU 1200. So compared with individual transmission of normal MF SC PPDUs 500, transmission efficiency is improved.

According to the second embodiment of the present disclosure, besides the same transmission bandwidth, all of the data fields in the aggregate MF SC PPDU 1200 have the same number of STSs. For example, as shown in FIG. 12, every data field in the aggregate MF SC PPDU 1200 has two STSs.

According to the second embodiment of the present disclosure, for all of the data fields in the aggregate MF SC PPDU 1200, each SC block includes the same number of data symbols and is prepended by the same guard interval 1251.

According to the second embodiment of the present disclosure, all of the NG60 headers are located together right before the NG60 STF 1207. Consequently, only the final SC block that is transmitted as the last NG60 header 1242 in the aggregate MF SC PPDU 1200 needs to be followed by the same guard interval 131. In other words, the number of required post-pended guard intervals for the NG60 headers is 1. In addition, all of the data fields are also located together right after the NG60 CEFs 1209. Therefore, only the final SC block per STS transmitted in the last data field 1244 in the aggregate MF SC PPDU 1200 needs to be followed by the same guard interval 1251 as the one preceding the last data field 1244. In other words, the number of required post-pended guard intervals for the data fields is 2.

According to the second embodiment of the present disclosure, compared with the first embodiment, due to the less number of guard intervals required, the transmission efficiency is further improved. Furthermore, since there is no need of changing the sampling rate so frequently, Tx and Rx processing is simplified and implementation complexity is further improved.

Figure 13:
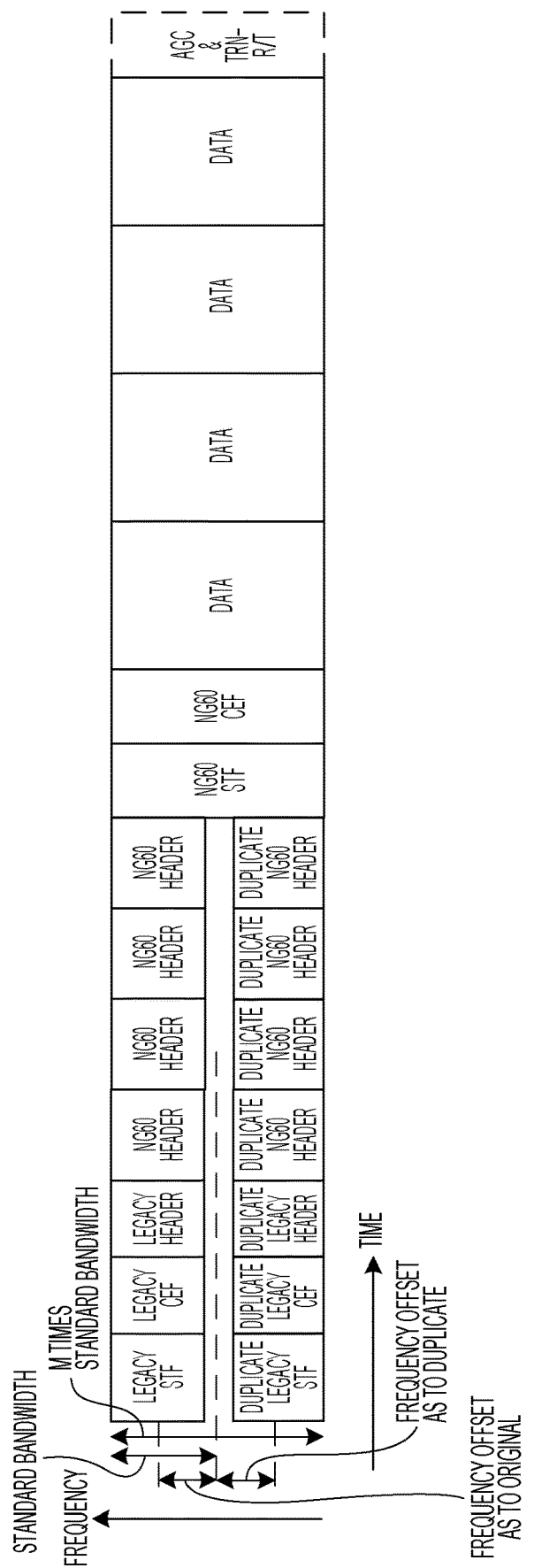
FIG. 13 is a diagram illustrating transmission of the example aggregate MF SC PPDU in a channel where channel bandwidth is two times of standard bandwidth according to the second embodiment of the present disclosure.

According to the second embodiment of the present disclosure, the NG60 STF 1207, the plurality of NG60 CEFs 1209, each of the data fields (e.g., 1214) and the optional AGC & TRN-R/T subfields 1245 can be transmitted with a variable bandwidth. However, the legacy STF 1201, the legacy CEF 1203, the legacy header 1205 and each of the NG60 headers (e.g., 1212) can be transmitted with the standard bandwidth only. FIG. 13 is a diagram illustrating transmission of the aggregated MF SC PPDU 1200 in a channel where its channel bandwidth is two times of standard bandwidth. As shown in FIG. 13, each of the original legacy STF, the original legacy CEF, the original legacy header and all of the original NG60 headers are duplicated in a frequency domain. Here, the frequency offset for the original legacy STF, the original legacy CEF, the original legacy header and all of the original NG60 headers can be set to 50% of the standard bandwidth and the frequency offset for the duplicated legacy STF, the duplicated legacy CEF, the duplicated legacy header and all of the duplicated NG60 headers can be set to −50% of the standard bandwidth.

According to the second embodiment of the present disclosure, the Tx baseband processor 700 for transmitting the MF SC PPDU 500 can be easily adapted for transmitting the aggregate MF SC PPDU 1200 because switching of the transmission bandwidth is unnecessary. For the same reason, the Rx baseband processor 900 for receiving the MF SC PPDU 500 can be easily adapted for receiving the aggregated MF SC PPDU 1200. Notice that the channel estimates obtained by the channel estimator 912 from the legacy CEF 1203 can be used for decoding all of the NG60 headers 1212, 1222, 1232 and 1242 in the received aggregate MF SC PPDU 1200. The channel estimates obtained by the channel estimator 912 from the NG60 CEFs 1209 can be used for decoding all of the data fields 1214, 1224, 1234 and 1244 in the received aggregate MF SC PPDU 1200. In addition, due to separation of a NG60 header and its corresponding data field, there is a need for storing the useful information of all of the NG60 headers for decoding all of the data fields. However, the required memory size may be trivial since the useful information of a NG60 header is small (about 7 bytes). As a result, compared with individual transmission and reception of normal MF SC PPDUs 500, transmission and reception of the aggregate MF SC PPDU 1200 does not increase implementation complexity significantly.

According to the second embodiment of the present disclosure, a legacy STA is able to decode the legacy header 1205 but cannot decode the remaining of the aggregate MF SC PPDU 1200. In order for the legacy STA to estimate transmission time of the aggregated MF SC PPDU 1200 correctly to avoid packet collision, the additional PPDU field in the legacy header 1205 shall be set to 0. In other words, the aggregate SC MF PPDU 1200 shall be envisioned by the legacy STA as a normal legacy SC PPDU 100 instead of legacy aggregate SC PPDU 400. In addition, the MCS field and the Length field in the legacy header 1205 shall be appropriately set so that the transmission time calculated by the legacy STA is the same as the actual transmission time of the equivalent data field, which includes the NG60 STF 1207, the NG60 CEFs 1209, all of the NG60 headers and all of the data fields in the aggregate MF vPPDU 1200. In other words, a total packet length of the NG60 STF 1207, the NG60 CEFs 1209, all of the NG60 headers 1212, 1222, 1232 and 1242 and all of the data fields 1214, 1224, 1234 and 1244 is set as the Length field in the legacy header 1205.

According to the second embodiment of the present disclosure, symbols may be inverted in the guard interval following the final SC block of every MF SC PPDU in the aggregate MF SC PPDU 1200. Inverting symbols can be performed by replacing bit 0 and bit 1 with bit 1 and bit 0, respectively. Consequently, the receiver can easily determine the boundary between neighboring data fields so that it can decode a data field even if some of NG60 headers preceding the NG60 header corresponding to the data field are lost.

The ideas and concepts disclosed in this embodiment can be implemented for formatting and transmission of MF OFDM PPDUs.

Third Embodiment

Figure 14:
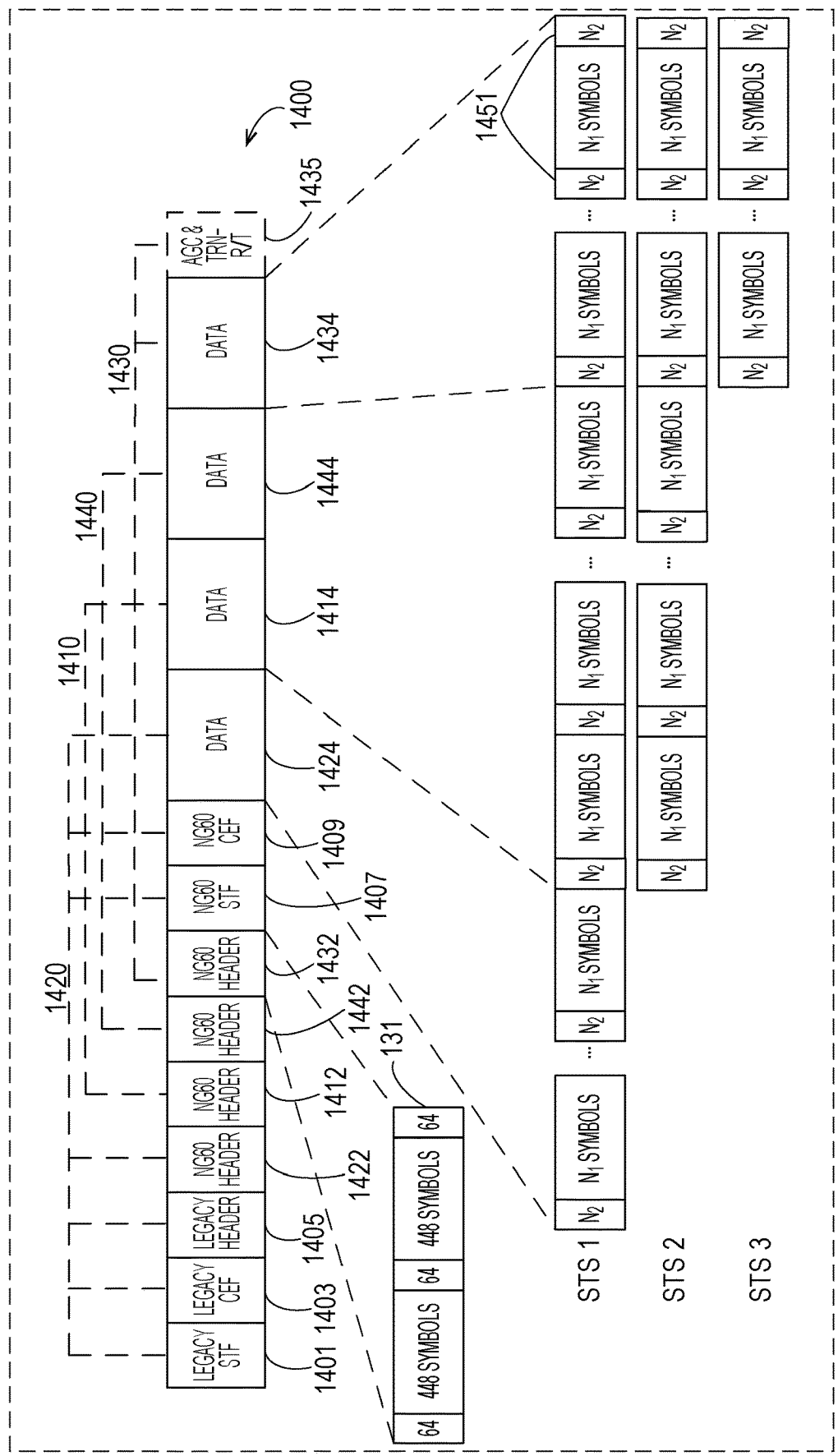
FIG. 14 illustrates the format of an example aggregate MF SC PPDU according to a third embodiment of the present disclosure.

FIG. 14 illustrates the format of another example of aggregate MF SC PPDU 1400 according to a third embodiment of the present disclosure. The aggregate MF SC PPDU 1400 includes four MF SC PPDUs 1410, 1420, 1430 and 1440. Each of the four MF SC PPDUs includes a NG60 header and a data field. For example, the MF SC PPDU 1410 includes a NG60 header 1412 and a data field 1414. The MF SC PPDU 1420 which is located at the beginning of the aggregate MF PPDU 1400 further includes a legacy STF 1401, a legacy CEF 1403, a legacy header 1405, a NG60 STF 1407, a plurality of NG60 CEFs 1409 and a data field 1424. The MF SC PPDU 1430 which is located at the end of the aggregate MF SC PPDU 1400 includes a NG60 header 1432 and a data field 1434 and further includes optional AGC&TRN-R/T subfields 1435. Notice that there are no IFS, preamble and separation between MF SC PPDU transmissions in the aggregate MF SC PPDU 1400. So compared with individual transmission of normal MF SC PPDUs, transmission efficiency is improved.

As is apparent from FIG. 14, all of the NG60 headers are located together right before the NG60 STF 1407. Consequently, only the final SC block that is transmitted as the last NG60 header 1432 in the aggregate MF PPDU 1400 needs to be followed by the same guard interval 131. In other words, the number of required post-pended guard intervals for the NG60 headers is 1. In addition, all of the data fields are also located together right after the NG60 CEFs 1409. Therefore, only the final SC block per STS transmitted in the last data field 1434 in the aggregate MF SC PPDU 1400 needs to be followed by the same guard interval 1451 as the one preceding the final SC block. The number of required post-pended guard intervals for the data fields is 3 in FIG. 14.

According to the third embodiment of the present disclosure, all of the data fields in the aggregate MF SC PPDU 1400 have the same transmission bandwidth. However, other transmission parameters (e.g., the number of STSs $N_{sts}$) for the data fields in the aggregate MF SC PPDU 1400 may be different. For example, as shown in FIG. 14, each of the data field 1414 and the data field 1444 has two STSs, while the data field 1424 has a single STS and the data field 1434 has three STSs. The number of NG60 CEFs 1409 depends on the maximum number of STSs among all of the data fields in the aggregate MF SC PPDU 1400. For example, if the maximum number of STSs among all of the data fields is 2, the number of NG60 CEFs 1409 can be set to 2. If the maximum number of STSs among all of the data fields is 3, the number of NG60 CEFs 1409 can be set to 4.

According to the third embodiment of the present disclosure, for all of the data fields in the aggregate MF SC PPDU 1400, each SC block includes the same number of data symbols and is prepended by the same guard interval 1451.

According to the third embodiment of the present disclosure, all of the NG60 headers are located together right before the NG60 STF 1407 in increasing order of the number of STSs which their corresponding data fields have. For example, as shown in FIG. 14, the NG60 header 1422 is located immediately after the legacy header 1405, followed by the NG60 header 1412 and the NG60 header 1442 as well as the NG60 header 1432 in this order. Alternatively, all of the NG60 headers are located together right before the NG60 STF 1407 in decreasing order of the number of STSs which their corresponding data fields have. Notice that only the final SC block transmitted of the NG60 header 1432 in the aggregate MF SC PPDU 1400 needs to be followed by the same guard interval 131 as inserted before. In other words, the number of required post-pended guard intervals for the NG60 headers is 1.

According to the third embodiment of the present disclosure, all of the data fields are located together right after the NG60 CEFs 1409 in the same order as the NG60 headers. For example, as shown in FIG. 14, the data field 1424 is located immediately after the NG60 CEFs 1409, followed by the data field 1414 and the data field 1444 as well as the data field 1434. Based on such arrangement of the data fields, only the final SC block per STS transmitted of the last data field 1434 in the aggregate MF SC PPDU 1400 needs to be followed by the same guard interval 1451. In other words, the number of required post-pended guard intervals is 3.

According to the third embodiment of the present disclosure, compared with the first embodiment, due to the less number of guard intervals required, the transmission efficiency is further improved. Furthermore, since there is no need of changing the sampling rate so frequently, TX/RX processing is simplified and implementation complexity is further improved.

According to the third embodiment of the present disclosure, the NG60 STF 1407, the plurality of NG60 CEFs 1409, each of the data fields (e.g., 1414) and the optional AGC & TRN-R/T subfields 1435 can be transmitted with variable bandwidth. However, the legacy STF 1401, the legacy CEF 1403, the legacy header 1405 and each of the NG60 headers (e.g., 1412) can be transmitted with standard bandwidth only. FIG. 13 is a diagram illustrating transmission of the aggregated MF SC PPDU 1400 in a channel where channel bandwidth is two times of standard bandwidth.

According to the third embodiment of the present disclosure, the Tx baseband processor 700 for transmitting the MF SC PPDU 500 can be easily adapted for transmitting the aggregate MF SC PPDU 1400. Similarly, the Rx baseband processor 900 for receiving the MF SC PPDU 500 can be easily adapted for receiving the aggregated MF SC PPDU 1400. Notice that the channel estimates obtained by the channel estimator 912 from the legacy CEF 1403 can be used for decoding all of the NG60 headers 1412, 1422, 1432 and 1442 in the received aggregate MF SC PPDU 1400. The channel estimates obtained by the channel estimator 912 from the NG60 CEFs 1409 can be used for decoding all of the data fields 1414, 1424, 1434 and 1444 in the received aggregate MF SC PPDU 1400. In addition, due to separation of a NG60 header and its corresponding data field, there is a need for storing the useful information of all of the NG60 headers for decoding all of the data fields. However, the required memory size may be trivial since the useful information of a NG60 header is small (about 7 bytes). As a result, compared with individual transmission and reception of normal MF SC PPDUs 500, transmission and reception of the aggregate MF SC PPDU 1400 does not increase implementation complexity significantly.

According to the third embodiment of the present disclosure, a legacy STA is able to decode the legacy header 1405 but cannot decode the remaining of the aggregate MF SC PPDU 1400. In order for the legacy STA to estimate transmission time of the aggregated MF SC PPDU 1400 correctly to avoid packet collision, the additional PPDU field in the legacy header 1405 shall be set to 0. In other words, the aggregate MF SC PPDU 1400 shall be envisioned by the legacy STA as a normal legacy SC PPDU 100 instead of legacy aggregate SC PPDU 400. In addition, the MCS field and the Length field in the legacy header 1405 shall be appropriately set so that the transmission time calculated by the legacy STA is the same as the actual transmission time of the equivalent data field, which includes the NG60 STF 1407, the NG60 CEFs 1409, all of the NG60 headers and all of the data fields in the aggregate MF SC PPDU 1400. In other words, a total packet length of the NG60 STF 1407, the NG60 CEFs 1409, all of the NG60 headers 1412, 1422, 1432 and 1442 and all of the data fields 1414, 1424, 1434 and 1444 is set as the Length field in the legacy header 1405.

According to the third embodiment of the present disclosure, symbols may be inverted in the guard interval following immediately the final SC block of every MF SC PPDU in the aggregate MF SC PPDU 1400. Inverting symbols can be performed by replacing bit 0 and bit 1 with bit 1 and bit 0, respectively. Consequently, the receiver can easily determine the boundary between neighboring data fields so that it can decode a data field even if some of NG60 headers preceding the NG60 header corresponding to the data field are lost.

The ideas and concepts disclosed in this embodiment can be implemented for formatting and transmission of MF OFDM PPDUs.

FIG. 15 is a block diagram illustrating example architecture of a wireless communication apparatus 1500 according to the present disclosure. The wireless communication apparatus 1500 includes a controller 1502, a Tx processor 1510, a Rx processor 1520 and a plurality of antennas 1530. The controller 1502 is includes a PPDU generator 1504, which is configured to create PPDUs, e.g., MF PPDU or aggregate MF PPDU. The Tx processor 1510 includes a Tx baseband processor 1512 and a Tx RF frontend 1514. The Rx processor 1520 includes a Rx baseband processor 1522 and a Rx RF frontend 1524. The Tx baseband processor 1512 is illustrated in FIG. 7 and the Rx baseband processor 1522 is illustrated in FIG. 9. The created PPDUs are transmitted through the antenna 1530 after transmitter processing by the Tx processor 1510. On the other hand, the controller 1502 is configured to analyze and process PPDUs which are received through the antenna 1530 after receiver processing by the Rx processor 1520.

Summarization of Embodiments

A transmission apparatus according to an aspect of the present disclosure includes: a transmission signal generator which, in operation, generates a transmission signal having an aggregate physical layer protocol data unit (aggregate PPDU) that includes a legacy preamble, a legacy header, a non-legacy preamble, a plurality of non-legacy headers, and a plurality of data fields; and a transmitter which, in operation, transmits the generated transmission signal, wherein the legacy preamble, the legacy header and the plurality of non-legacy headers are transmitted using a standard bandwidth, the non-legacy preamble and the plurality of data fields are transmitted using a variable bandwidth that is larger than the standard bandwidth and wherein a plurality of sets of each of the plurality of non-legacy headers and each of the plurality of data fields are transmitted sequentially in a time domain.

The non-legacy preamble may include a non-legacy short training field (STF) and a plurality of non-legacy channel estimation fields (CEFs) in this order, and one of the plurality of non-legacy headers is located right before the non-legacy STF and one of the plurality of data fields is located right after of the non-legacy CEFs; each of the plurality of remaining non-legacy headers is located right before each of the plurality of remaining data fields.

A single carrier (SC) block or an orthogonal frequency division multiplexing (OFDM) symbol, which is transmitted in each of the plurality of non-legacy headers may be pre-pended by a guard interval, and a final SC block transmitted in each of the plurality of non-legacy headers is post-pended by a same guard interval as the pre-pended guard interval.

A single carrier (SC) block or an orthogonal frequency division multiplexing (OFDM) symbol, per space-time stream, which is transmitted in each of the plurality of data fields is pre-pended by a guard interval, and a final SC block per space-time stream transmitted in each of the plurality of data fields may be post-pended by a same guard interval as the pre-pended guard interval.

The non-legacy preamble may include a non-legacy short training field (STF) and a plurality of non-legacy channel estimation fields (CEFs) in this order. The plurality of non-legacy headers may be located before the non-legacy STF; the plurality of data fields are located after the plurality of non-legacy CEFs.

The plurality of sets may be located in a decreasing or in an increasing order of a number of space-time streams of each of the plurality of data fields.

A single carrier (SC) block or an orthogonal frequency division multiplexing (OFDM) symbol, which is transmitted in each of the plurality of non-legacy headers may be pre-pended by a guard interval. The final SC block transmitted in the last non-legacy header may be post-pended by a same guard interval as the pre-pended guard interval.

A single carrier (SC) block or an orthogonal frequency division multiplexing (OFDM) symbol, per space-time stream, which is transmitted in each of the plurality of data fields may be pre-pended by a guard interval. A final SC block per space-time stream transmitted in each of the plurality of data fields may be post-pended by a same guard interval as the pre-pended guard interval.

Symbols in the post-pended guard interval may be inverted.

A transmission method according to an aspect of the present disclosure includes: generating a transmission signal having an aggregate physical layer protocol data unit (aggregate PPDU) that includes a legacy preamble, a legacy header, a non-legacy preamble, a plurality of non-legacy headers, and a plurality of data fields; and transmitting the generated transmission signal, wherein the legacy preamble, the legacy header and the plurality of non-legacy headers are transmitted using a standard bandwidth, the non-legacy preamble and the plurality of data fields are transmitted using a variable bandwidth that is larger than the standard bandwidth and wherein a plurality of sets each of the plurality of non-legacy headers and each of the plurality of data fields are transmitted sequentially in a time domain.

The non-legacy preamble may include a non-legacy short training field (STF) and a plurality of non-legacy channel estimation fields (CEFs) in this order. One of the plurality of non-legacy headers may be located right before the non-legacy STF and one of the plurality of data fields is located right after of the non-legacy CEFs, each of the plurality of remaining non-legacy headers is located right before each of the plurality of remaining data fields.

A single carrier (SC) block or an orthogonal frequency division multiplexing (OFDM) symbol, which is transmitted in each of the plurality of non-legacy headers may be pre-pended by a guard interval. A final SC block transmitted in each of the plurality of non-legacy headers may be post-pended by a same guard interval as the pre-pended guard interval.

A single carrier (SC) block or an orthogonal frequency division multiplexing (OFDM) symbol, per space-time stream, which is transmitted in each of the plurality of data fields may be pre-pended by a guard interval. A final SC block per space-time stream transmitted in each of the plurality of data fields may be post-pended by a same guard interval as the pre-pended guard interval.

The non-legacy preamble may include a non-legacy short training field (STF) and a plurality of non-legacy channel estimation fields (CEFs) in this order. The plurality of non-legacy headers may be located before the non-legacy STF; the plurality of data fields are located after the plurality of non-legacy CEFs.

The plurality of sets may be located in a decreasing or in an increasing order of a number of space-time streams of each of the plurality of data fields.

A single carrier (SC) block or an orthogonal frequency division multiplexing (OFDM) symbol, which is transmitted in each of the plurality of non-legacy headers is pre-pended by a guard interval, and the final SC block transmitted in the last non-legacy header may be post-pended by a same guard interval as the pre-pended guard interval.

A single carrier (SC) block or an orthogonal frequency division multiplexing (OFDM) symbol, per space-time stream, which is transmitted in each of the plurality of data fields is pre-pended by a guard interval, and a final SC block per space-time stream transmitted in each of the plurality of data fields may be post-pended by a same guard interval as the pre-pended guard interval.

Symbols in the post-pended guard interval may be inverted.

While the embodiments have been described with reference to the drawings, it is needless to say that the present description is not restricted to these examples. It is obvious that one skilled in the art would be able to reach various modifications and alterations without departing from the scope of the Claims, and that such modifications and alterations belong to the technical scope of the present disclosure as a matter of course. The components in the above-described embodiments may also be optionally combined without departing from the scope of the present disclosure.

While the above embodiments have been described exemplifying examples of configuring the disclosure using hardware, the present disclosure may be realized by software in conjunction with hardware.

The functional blocks used in the description of the embodiments above may be realized as a large-scale integration (LSI) that is an integrated circuit (IC) having input terminals and output terminals. These may each be independently formed as single chips, or part or all may be included in a single chip. While an LSI has been described, there are different names according to the degree of integration, such as IC, system LSI, super LSI, and ultra LSI.

The way in which the integrated circuit is formed is not restricted to LSIs, and may be realized by dedicated circuits or general-purpose processors. A field programmable gate array (FPGA) capable of being programmed after manufacturing the LSI, or a reconfigurable processor of which the connections and settings of circuit cells within the LSI can be reconfigured, may be used.

Moreover, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

This disclosure can be applied to a method for formatting and transmitting an aggregate PPDU in a wireless communications system.

What is claimed is:

1. A reception apparatus comprising:
a receiver which, in operation, receives, from a transmission apparatus, a transmission signal having an aggregate physical layer protocol data unit (aggregate PPDU) that includes a first set and one or more second sets, the first set including a plurality of first fields arranged in order of a legacy preamble field, a legacy header field, a non-legacy header field, a non-legacy preamble field, and a data field on a time axis, each of the one or more second sets including a plurality of second fields arranged in order of the non-legacy header field and the data field on the time axis; and
a decoder which, in operation, decodes the transmission signal to generate decoded bits for the data field in the first set and the data field in the plurality of second sets by using the non-legacy header field and the non-legacy preamble field, wherein
the legacy preamble field, the legacy header field, and the non-legacy header field of the first set is generated as one stream, and the data field of the first set and the data field of the one or more second set are generated as a plurality of streams at the transmission apparatus.

2. The reception apparatus according to claim 1, wherein the non-legacy preamble field includes a non-legacy short training field (STF) and a plurality of non-legacy channel estimation fields (CEFs), and
the receiver receives, on the time axis, in order of the non-legacy STF and the plurality of non-legacy CEFs.

3. The reception apparatus according to claim 2, wherein non-legacy header field is generated as a single carrier (SC) block or an orthogonal frequency division multiplexing (OFDM) symbol which is pre-pended by a guard interval, and a final SC block in the non-legacy header field of the first set is post-pended by a same guard interval as the pre-pended guard interval.

4. The reception apparatus according to claim 2, wherein the data field is generated as a single carrier (SC) block or an orthogonal frequency division multiplexing (OFDM) symbol which is pre-pended by a guard interval, and a final SC block in the data field is post-pended by a same guard interval as the pre-pended guard interval.

5. The reception apparatus according to claim 1, wherein the non-legacy header field is generated as a single carrier (SC) block or an orthogonal frequency division multiplexing (OFDM) symbol which is pre-pended by a guard interval, and the final SC block in a final non-legacy header field of the one or more second sets is post-pended by a same guard interval as the pre-pended guard interval.

6. The transmission apparatus according to claim 3, wherein
symbols in the post-pended guard interval are inverted.

7. A reception method comprising:
receiving, from a transmission apparatus, a transmission signal having an aggregate physical layer protocol data unit (aggregate PPDU) that includes a first set and one or more second sets, the first set including a plurality of first fields arranged in order of a legacy preamble field, a legacy header field, a non-legacy header field, a non-legacy preamble field, and a data field on a time axis, each of the one or more second sets including a plurality of second fields arranged in order of the non-legacy header field and the data field on the time axis; and
decoding the transmission signal to generate decoded bits for the data field in the first set and the data field in the plurality of second sets by using the non-legacy header field and the non-legacy preamble field, wherein
the legacy preamble field, the legacy header field, and the non-legacy header field of the first set is generated as one stream, and the data field of the first set and the data field of the one or more second set are generated as a plurality of streams at the transmission apparatus.

8. The reception method according to claim 7, wherein the non-legacy preamble field includes a non-legacy short training field (STF) and a plurality of non-legacy channel estimation fields (CEFs), and
the receiver receives, on the time axis, in order of the non-legacy STF and the plurality of non-legacy CEFs.

9. The reception method according to claim 8, wherein non-legacy header field is generated as a single carrier (SC) block or an orthogonal frequency division multiplexing (OFDM) symbol which is pre-pended by a guard interval, and a final SC block in the non-legacy header field of the first set is post-pended by a same guard interval as the pre-pended guard interval.

10. The reception method according to claim 8, wherein the data field is generated as a single carrier (SC) block or an orthogonal frequency division multiplexing (OFDM) symbol which is pre-pended by a guard interval, and a final SC block in the data field is post-pended by a same guard interval as the pre-pended guard interval.

11. The reception method according to claim 7, wherein the non-legacy header field is generated as a single carrier (SC) block or an orthogonal frequency division multiplexing (OFDM) symbol which is pre-pended by a guard interval, and the final SC block in a final non-legacy header field of the one or more second sets is post-pended by a same guard interval as the pre-pended guard interval.

12. The reception method according to claim 9, wherein symbols in the post-pended guard interval are inverted.

* * * * *